United States Patent
Choi et al.

(10) Patent No.: US 8,488,708 B2
(45) Date of Patent: Jul. 16, 2013

(54) ROTATING REFERENCE CODEBOOK THAT IS USED IN A MULTIPLE-INPUT MULTIPLE-OUTPUT (MIMO) COMMUNICATION SYSTEM

(75) Inventors: Junil Choi, Seoul (KR); Bruno Clerckx, Yongin-si (KR); Ki Il Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 434 days.

(21) Appl. No.: 12/819,428

(22) Filed: Jun. 21, 2010

(65) Prior Publication Data

US 2011/0002404 A1 Jan. 6, 2011

(30) Foreign Application Priority Data

| Jul. 3, 2009 | (KR) | 10-2009-0060495 |
| Sep. 30, 2009 | (KR) | 10-2009-0093085 |
| Apr. 2, 2010 | (KR) | 10-2010-0030544 |

(51) Int. Cl.
*H04L 1/02* (2006.01)

(52) U.S. Cl.
USPC .......................................................... 375/267

(58) Field of Classification Search
USPC .. 375/267, 295, 299, 316, 347, 260; 370/329; 341/106
See application file for complete search history.

(56) References Cited

U.S. PATENT DOCUMENTS

| 2008/0247475 A1* | 10/2008 | Kim et al. ..................... 375/260 |
| 2008/0292013 A1* | 11/2008 | Varadarajan et al. ......... 375/260 |
| 2011/0080964 A1* | 4/2011 | Shamsi et al. ................ 375/260 |

* cited by examiner

*Primary Examiner* — Khai Tran
(74) *Attorney, Agent, or Firm* — NSIP Law

(57) ABSTRACT

A rotating reference codebook used in a multiple input multiple output (MIMO) communication system is provided. The reference codebook includes codewords from a discrete Fourier transform (DFT) codebook. A base station and a terminal may calculate a rotation matrix based on a previous preferred codeword and a random codeword among codewords included in the DFT codebook. A reference codebook may be rotated using the rotation matrix and may be transformed to a new codebook. The reference codebook may include codewords of a polar cap codebook and the codewords of the DFT codebook. Even though the codewords of the DFT codebook are rotated, the codewords of the DFT codebook may remain in the new codebook as elements of the DFT codebook.

42 Claims, 8 Drawing Sheets

ROTATING REFERENCE CODEBOOK THAT IS USED IN A MULTIPLE-INPUT MULTIPLE-OUTPUT (MIMO) COMMUNICATION SYSTEM

CROSS-REFERENCE TO RELATED APPLICATIONS

This application claims the benefit under 35 U.S.C. §119(a) of Korean Patent Application No. 10-2009-0060495, filed on Jul. 3, 2009, a Korean Patent Application No. 10-2009-0093085, filed on Sep. 30, 2009, and Korean Patent Application No. 10-2010-0030544, filed on Apr. 2, 2010, in the Korean Intellectual Property Office, the entire disclosure of each of which is incorporated herein by reference for all purposes.

BACKGROUND

1. Field

The following description relates to a codebook used in a multiple-input multiple-output (MIMO) communication system, and more particularly, to a rotating reference codebook that includes codewords from a discrete Fourier transform (DFT) codebook.

2. Description of Related Art

Researches are being conducted to provide various types of multimedia services and to provide high quality and high speed data transmission in a wireless communication environment. One potential solution is a multiple-input multiple-output (MIMO) communication system using multiple channels.

In a MIMO communication system, a base station and terminals may use a codebook to enhance the channel environment between the base station and the terminals. A particular space may be quantized into a plurality of codewords by quantizing space according to a predetermined criterion. The plurality of codewords that are generated may be stored in the base station and in the terminals. Each of the codewords may be a vector or a matrix.

For example, each of the terminals may select one matrix or vector corresponding to channel information from matrices or vectors included in a codebook, based on a channel formed between the base station and each of the terminals. The base station may verify channel information based on the received matrix or vector selected by the terminal. For example, the selected matrix or vector may be used when the base station performs precoding or performs transmission using multiple antennas.

SUMMARY

In one general aspect, there is provided a method for a transmitter, comprising recognizing a previous preferred codeword of a receiver, calculating a rotation matrix based on the previous preferred codeword of the receiver and a random codeword included in a discrete Fourier transform (DFT) codebook, and generating a new codebook by rotating a reference codebook using the rotation matrix, or recognizing a new preferred codeword by rotating at least one codeword included in the reference codebook using the rotation matrix.

The calculating of the rotation matrix may comprise calculating the rotation matrix according to the following equation:

$$R=[\tilde{w}_p \, \tilde{w}_p^\perp][\tilde{w}_i \, \tilde{w}_i^\perp]^H,$$

where R refers to the rotation matrix, $\tilde{w}_p$ refers to the previous preferred codeword of the receiver, $\tilde{w}_i$ refers to the random codeword among the codewords comprised in the DFT codebook, $[\tilde{w}_p \, \tilde{w}_p^\perp]$ refers to a unitary matrix associated with $\tilde{w}_p$, $[\tilde{w}_i \, \tilde{w}_i^\perp]$ refers to a predefined unitary matrix associated with $\tilde{w}_i$, and H refers to a Hermitian.

When the previous preferred codeword $\tilde{w}_p$ of the receiver corresponds to the random codeword included in the DFT codebook, $[\tilde{w}_p \, \tilde{w}_p^\perp]$ may be represented according to the following equation:

$$[\tilde{w}_p \, \tilde{w}_p^\perp] = \begin{bmatrix} \tilde{w}_{p1} & \cdots & \cdots \\ \cdots & \tilde{w}_{pn}\exp\left\{j\frac{2\pi}{n_t}(n-1)(m-1)\right\} & \cdots \\ \tilde{w}_{pn_t} & \cdots & \cdots \end{bmatrix},$$

where $\tilde{w}_{pn}$ refers to an $n^{th}$ element of $\tilde{w}_p$, n refers to an $n^{th}$ row of $[\tilde{w}_p \, \tilde{w}_p^\perp]$, m refers to an $m^{th}$ column of $[\tilde{w}_p \, \tilde{w}_p^\perp]$, and $n_t$ refers to a number of transmit antennas.

When the previous preferred codeword $\tilde{w}_p$ of the receiver is not included in the codewords of the DFT codebook, $[\tilde{w}_p \, \tilde{w}_p^\perp]$ may be generated by orthogonalizing a matrix of the following equation:

$$\begin{bmatrix} \tilde{w}_{p1} & \cdots & \cdots \\ \cdots & \tilde{w}_{pn}\exp\left\{j\frac{2\pi}{n_t}(n-1)(m-1)\right\} & \cdots \\ \tilde{w}_{pn_t} & \cdots & \cdots \end{bmatrix},$$

where $\tilde{w}_{pn}$ refers to an $n^{th}$ element of $\tilde{w}_p$, n refers to an $n^{th}$ row of the matrix of the equation, m refers to an $m^{th}$ column of the matrix of the equation, and $n_t$ refers to a number of transmit antennas.

The calculating of the rotation matrix may comprise generating $[\tilde{w}_p \, \tilde{w}_p^\perp]$ based on the previous preferred codeword of the receiver by employing a Gram-Schmidt orthogonalization.

When the previous preferred codeword of the receiver corresponds to one of the codewords included in the DFT codebook, the calculating of the rotation matrix may comprise calculating the rotation matrix into a diagonal matrix form.

The method may further comprise receiving, from the receiver, information associated with the new preferred codeword; and recognizing the new preferred codeword based on information about the new preferred codeword, or recognizing the new preferred codeword using a codeword corresponding to information about the new preferred codeword included in the reference codebook and the rotation matrix.

The reference codebook may include codewords of a polar cap codebook and the codewords of the DFT codebook, wherein the codewords of the polar cap codebook surround a random reference codeword.

In another aspect, there is provided a method for a receiver, comprising calculating a rotation matrix to comprise codewords of a DFT codebook, when a previous preferred codeword corresponds to one of the codewords of the DFT codebook, and generating a new codebook by rotating a reference codebook using the rotation matrix, or generating a new preferred codeword by rotating at least one codeword included in the reference codebook using the rotation matrix.

The calculating of the rotation matrix may comprise calculating the rotation matrix based on the previous preferred codeword and a random codeword included in the DFT codebook.

The calculating of the rotation matrix may comprise calculating the rotation matrix according to the following equation:

$$R=[\tilde{w}_p \, \tilde{w}_p^\perp][\tilde{w}_i \, \tilde{w}_i^\perp]^H,$$

where R refers to the rotation matrix, $\tilde{w}_p$ refers to the previous preferred codeword, $\tilde{w}_i$ refers to the random codeword among the codewords comprised in the DFT codebook, $[\tilde{w}_p \; \tilde{w}_p^\perp]$ refers to a predefined unitary matrix associated with $\tilde{w}_p$, $[\tilde{w}_i \; \tilde{w}_i^\perp]$ refers to a unitary matrix associated with $\tilde{w}_i$, and H refers to a Hermitian.

When the previous preferred codeword $\tilde{w}_p$ corresponds to the random codeword included in the DFT codebook, $[\tilde{w}_p \; \tilde{w}_p^\perp]$ may be represented according to the following equation:

$$[\tilde{w}_p \; \tilde{w}_p^\perp] = \begin{bmatrix} \tilde{w}_{p1} & \cdots & \cdots \\ \cdots & \tilde{w}_{pn}\exp\left\{j\frac{2\pi}{n_t}(n-1)(m-1)\right\} & \cdots \\ \tilde{w}_{pn_t} & \cdots & \cdots \end{bmatrix},$$

where $\tilde{w}_{pn}$ refers to an $n^{th}$ element of $\tilde{w}_p$, n refers to an $n^{th}$ row of $[\tilde{w}_p \; \tilde{w}_p^\perp]$, m refers to an $m^{th}$ column of $[\tilde{w}_p \; \tilde{w}_p^\perp]$, and $n_t$ refers to a number of transmit antennas installed in a transmitter.

When the previous preferred codeword $\tilde{w}_p$ is not included in the codewords of the DFT codebook, $[\tilde{w}_p \; \tilde{w}_p^\perp]$ may be generated by orthogonalizing a matrix of the following equation:

$$\begin{bmatrix} \tilde{w}_{p1} & \cdots & \cdots \\ \cdots & \tilde{w}_{pn}\exp\left\{j\frac{2\pi}{n_t}(n-1)(m-1)\right\} & \cdots \\ \tilde{w}_{pn_t} & \cdots & \cdots \end{bmatrix},$$

where $\tilde{w}_{pn}$ refers to an $n^{th}$ element of $\tilde{w}_p$, n refers to an $n^{th}$ row of the matrix of the equation, m refers to an $n^{th}$ column of the matrix of the equation, and $n_t$ refers to a number of transmit antennas installed in a transmitter.

The method may further comprise determining a new preferred codeword based on the new codebook, or determining the new preferred codeword based on at least one codeword included in the reference codebook and the rotation matrix, and feeding back, to a transmitter, information associated with the new preferred codeword, wherein information associated with the new preferred codeword comprises information about an index of the new preferred codeword in the new codebook or information about an index of a codeword corresponding to the new preferred codeword in the reference codebook.

In another aspect, there is provided a non-transitory computer-readable storage medium comprising a program for causing a processor to implement a method for a transmitter, the method comprising recognizing a previous preferred codeword of a receiver, calculating a rotation matrix based on the previous preferred codeword of the receiver and a random codeword included in a discrete Fourier transform (DFT) codebook, and generating a new codebook by rotating a reference codebook using the rotation matrix, or recognizing a new preferred codeword by rotating at least one codeword in the reference codebook using the rotation matrix.

In another aspect, there is provided a transmitter, comprising a recognition unit to recognize a previous preferred codeword of a receiver, a calculator to calculate a rotation matrix based on the previous preferred codeword of the receiver and a random codeword included in a DFT codebook, and a generator to generate a new codebook by rotating a reference codebook using the rotation matrix, or to recognize a new preferred codeword of the receiver by rotating at least one codeword included in the reference codebook using the rotation matrix.

In another aspect, there is provided a receiver, comprising a calculator to calculate a rotation matrix to comprise codewords of a DFT codebook, when a previous preferred codeword corresponds to one of the codewords of the DFT codebook, and a generator to generate a new codebook by rotating a reference codebook using the rotation matrix, or to generate a new preferred codeword by rotating at least one codeword included in the reference codebook using the rotation matrix.

In another aspect, there is provided a method for a receiver, comprising vectorizing information associated with a previous explicit channel matrix between a transmitter and the receiver, in order to obtain vectorized channel information, selecting a previous preferred codeword based on the vectorized channel information, calculating a rotation matrix based on the previous preferred codeword, and generating the new codebook by rotating a reference codebook using the rotation matrix, or generating a new preferred codeword by rotating at least one codeword included in the reference codebook using the rotation matrix.

The reference codebook may be determined based on codewords of a polar cap codebook, wherein the codewords of the polar cap codebook surround a random reference codeword and the codewords of the DFT codebook.

The elements included in the random reference codeword may be $$\frac{1}{\sqrt{N_t^2}},$$

and $N_t$ may refer to a number of transmit antennas installed in the transmitter.

Each codeword included in the reference codebook may have a dimension of $N_t^2 \times 1$, and $N_t$ may refer to a number of transmit antennas installed in the transmitter.

The reference codebook may be determined based on chordal distances between the codewords of the polar cap codebook and the codewords of the DFT codebook.

The vectorizing may comprise vectorizing the explicit channel matrix to a single vector, or vectorizing information generated by processing the explicit channel matrix to a single vector, in order to obtain the vectorized channel information.

The selecting of the previous preferred codeword may comprise selecting the previous preferred codeword from a plurality of codewords included in a previous codebook or a basic codebook.

The method may further comprise feeding back, to the transmitter, information associated with the new preferred codeword, wherein information associated with the new preferred codeword comprises information about an index of the new preferred codeword in the new codebook or information about an index of a codeword corresponding to the new preferred codeword in the reference codebook.

The calculating of the rotation matrix may comprise calculating the rotation matrix based on the random reference codebook and the previous preferred codeword.

In another aspect, there is provided a method for a transmitter, comprising recognizing a previous preferred codeword selected by a receiver based on a previous explicit channel matrix between the transmitter and the receiver, calculating a rotation matrix based on the previous preferred codeword, and generating the new codebook by rotating a reference codebook using the rotation matrix, or generating a new preferred codeword by rotating at least one codeword included in the reference codebook using the rotation matrix.

The reference codebook may be determined based on codewords of a polar cap codebook, wherein the codewords of the polar cap codebook surround a random reference codeword and the codewords of the DFT codebook.

Each of codewords included in the reference codebook may have a dimension of $N_t^2 \times 1$, and $N_t$ may refer to a number of transmit antennas installed in the transmitter.

The reference codebook may be determined based on chordal distances between the codewords of the polar cap codebook and the codewords of the DFT codebook.

The method may further comprise receiving, from the receiver, information associated with the new preferred codeword, and recognizing the new preferred codeword using the new codebook based on information associated with the new preferred codeword, or recognizing the new preferred codeword using a codeword corresponding to information associated with the new preferred codeword from among codewords comprised in the reference codebook and the rotation matrix.

The calculating of the rotation matrix may comprise vectorizing the previous preferred codeword, and calculating the rotation matrix based on the vectorized previous preferred codeword.

In another aspect, there is provided a receiver, comprising a vectorization unit to vectorize information associated with a previous explicit channel matrix between a transmitter and the receiver, in order to obtain vectorized channel information, a selector to select a previous preferred codeword based on the vectorized channel information, a calculator to calculate a rotation matrix based on the previous preferred codeword, and a generator to generate the new codebook by rotating a reference codebook using the rotation matrix, or to generate a new preferred codeword by rotating at least one codeword included in the reference codebook using the rotation matrix.

In another aspect, there is provided a transmitter, comprising a recognition unit to recognize a previous preferred codeword selected by a receiver based on a previous explicit channel matrix between the transmitter and the receiver, a calculator to calculate a rotation matrix based on the previous preferred codeword, and a generator to generate the new codebook by rotating a reference codebook using the rotation matrix, or to generate a new preferred codeword by rotating at least one codeword included in the reference codebook using the rotation matrix.

In another aspect, there is provided a method for a transmitter, comprising recognizing a previous preferred codeword of a receiver, accessing a memory that has pre-stored therein a product between a reference codebook and a matrix based on a reference codeword, wherein the reference codeword is a codeword of a DFT codebook, the reference codebook comprises codewords of a polar cap codebook, and the codewords of the polar cap codebook surround the reference codeword and the codewords of the DFT codebook, and generating a new codebook based on the product, using the previous preferred codeword, or generating a new preferred codeword based on the product, using the previous preferred codeword.

The method may further comprise receiving, from the receiver, information associated with the new preferred codeword, and recognizing the new preferred codeword using the new codebook based on information associated with the new preferred codeword, or recognizing the new preferred codeword by extracting a codeword corresponding to information associated with the new preferred codeword from the product between the reference codeword and the reference codebook.

Information associated with the new preferred codeword may comprise information about an index of the new preferred codeword in the new codebook or information about an index of a codeword corresponding to the new preferred codeword in the product between the reference codeword and the reference codebook.

In another aspect, there is provided a method for a receiver, comprising accessing a memory that has pre-stored therein a product between a reference codebook and a matrix based on a reference codeword, wherein the reference codeword is a codeword of a DFT codebook, the reference codebook comprises codewords of a polar cap codebook, and the codewords of the polar cap codebook surround the reference codeword and the codewords of the DFT codebook, and generating a new codebook based on the product, using the previous preferred codeword, or generating a new preferred codeword from the product, using the previous preferred codeword.

The method may further comprise determining the new preferred codeword based on the new codebook, or determining the new preferred codeword based on at least one codeword extracted from the product, and feeding back, to a transmitter, information associated with the new preferred codeword, wherein information associated with the new preferred codeword comprises information about an index of the new preferred codeword in the new codebook or information about an index of a codeword corresponding to the new preferred codeword in the reference codebook.

In another aspect, there is provided a method for a transmitter, comprising receiving, from a receiver, information associated with at least one candidate pre-stored in a memory, determining a rotation matrix using the received information, and generating a new codebook or recognizing a new preferred codeword of the receiver by rotating a reference codebook using the rotation matrix.

The at least one candidate pre-stored in the memory may be based on codewords of a DFT codebook, and the information comprises an index of the at least one candidate.

In another aspect, there is provided a method for a receiver, comprising estimating a channel between a transmitter and the receiver, selecting, as a rotation matrix, at least one candidate pre-stored in a memory based on the estimated channel, and feeding back, to the transmitter, information associated with the selected at least one candidate, wherein a new preferred codeword corresponding to the channel is calculated based on a reference codebook and the rotation matrix.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
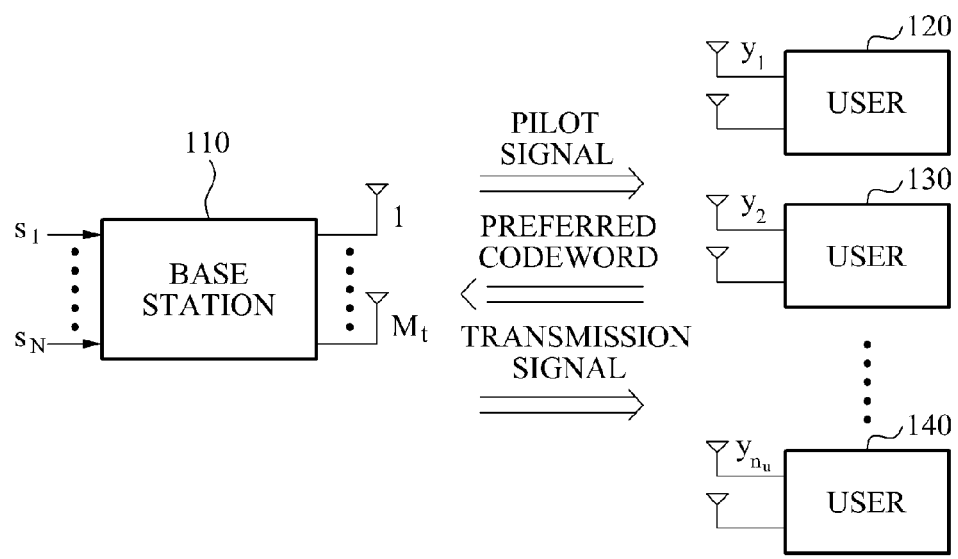
FIG. 1 is a diagram illustrating an example of a closed-loop multiple-input multiple-output (MIMO) communication system.

FIG. 1 illustrates an example of a closed-loop multiple-input multiple-output (MIMO) communication system.

Referring to FIG. 1, the closed-loop MIMO communication system includes a base station 110 and a plurality of users 120, 130, and 140. FIG. 1 illustrates an example of a multi-user MIMO communication system. However, it should be understood that various embodiments may be applicable to a single-user MIMO communication system including a base station and a single user. The term "closed-loop" indicates that the users 120, 130, and 140 are able to feed back data to the base station 110. The base station 110 may generate a transmission signal based on the feedback data.

One or more antennas may be installed in the base station 110. A single or a plurality of antennas may be installed in each of the users 120, 130, and 140. A channel may be formed between the base station 110 and each of the users 120, 130, and 140. Signals may be transmitted and received via each formed channel.

The base station 110 may transmit a single data stream or a plurality of data streams to the users 120, 130, and 140. For example, the base station 110 may adopt a space division multiple access (SDMA) scheme or an SDM scheme. The base station 110 may generate a precoding matrix based on codewords included in a codebook, and generate a transmission signal using the generated precoding matrix. As described herein, the codewords may be a matrix and/or a vector.

Each of the users 120, 130, and 140 may use explicit feedback that is described further herein. When each of the users 120, 130, and 140 feeds back data such as a Hermitian matrix $H^H H$, each of the codewords may be in a form of a matrix. When each of the users 120, 130, and 140 feeds back data such as H, each of the codewords may be in a form of a vector or the matrix that is based on the number of receive antennas. When each of the users 120, 130, and 140 feeds back vectorized $H^H H$ or vectorized H, each of the codewords may be in a form of the vector. When each of the users 120, 130, and 140 uses an implicit feedback, each of the codewords may be a matrix or a vector that is based on a transmission rank.

The base station 110 may transmit pilot signals to the users 120, 130, and 140 via downlink channels. The pilot signals may be known to the base station 110 and the users 120, 130, and 140. As describe herein, each of the users 120, 130, and 140 should also be understood to refer to one or more of users 120, 130, and/or 140.

A terminal corresponding to each of the users 120, 130, and 140 may receive the known signal transmitted from the base station 110, estimate a channel formed between the base station 110 and each of the users 120, 130, and 140, based on a pilot signal, select at least one codeword from a codebook, and feed back information associated with the selected codeword to the base station. The codebook may be changed depending on a channel state. For example, because at least one codeword selected by each of the users 120, 130, and 140 may be associated with the channel state, the codebook may be changed according to the at least one codeword selected by the users 120, 130, and 140.

Each of the users 120, 130, and 140 may estimate the channel formed between the base station 110 and each of the users 120, 130, and 140 based on the pilot signal. Each of the users 120, 130, and 140 may select at least one preferred codeword included in a pre-stored codebook, based on the estimated channel. The preferred codeword may also be referred to as a preferred vector or a preferred matrix.

For example, each of the users 120, 130, and 140 may select the preferred codeword from among $2^B$ codewords based on an achievable data rate and/or a signal-to-interference and noise ratio (SINR). In this example, B denotes a number of feedback bits, and the number of codewords may be equal to the number two multiplied B times. Each of the users 120, 130, and 140 using the implicit feedback may determine their own preferred transmission rank. The transmission rank may correspond to a number of data streams. When each of the users 120, 130, and 140 uses the explicit feedback, the transmission rank may be determined by the base station 110.

Each of the users 120, 130, and 140 may feed back information associated with the selected preferred codeword (hereinafter, channel information), to the base station 110. As described herein, channel information may include, for example, channel state information, channel quality information, channel direction information, and the like.

The base station 110 may receive channel information from of each of the users 120, 130, and 140 and determine a precoding matrix based on the received channel information. The base station 110 use the channel information received from a portion of or all of the users 120, 130, and 140, according to various types of user selection algorithms such as a semi-orthogonal user selection (SUS) algorithm, a greedy user selection (GUS) algorithm, and the like.

The base station 110 may pre-store the same codebook that is stored in each of the users 120, 130, and 140. The base station 110 may determine the precoding matrix based on codewords included in the pre-stored codebook using channel information fed back from each of the users 120, 130, and 140. Accordingly, the base station 110 may determine the precoding matrix to maximize a sum rate.

The base station 110 may generate a transmission signal by precoding data streams $S_1$ and $S_N$ based on the determined precoding matrix. A process of generating the transmission signal, by the base station 110, may be referred to as "beamforming."

A channel environment between the base station and each of the users 120, 130, and 140 may vary over time. As a result, when the base station 110 and the users 120, 130, and 140 use a fixed codebook, it may be difficult to adaptively cope with a varying channel environment. According to various embodiments, the base station 110 and the users 120, 130, and 140 may adaptively change a codebook to adaptively cope with a varying channel environment.

The base station 110 may generate the precoding matrix based on a changed codebook. For example, the base station 110 may change a previous precoding matrix with the new precoding matrix based on the changed codebook.

For example, the MIMO communication system may change the codebook based on a time correlation coefficient ρ of the channel that is formed between the base station 110 and each of the users 120, 130, and 140. The MIMO communication system may change the codebook based on information corresponding to the time correlation coefficient ρ, for example, a Doppler coefficient, statistics about a channel change, and the like. The statistics about the channel change may include a change speed of the channel, a change amount of the channel, a change pattern of the channel, and the like. Because the preferred codeword selected by each of the users 120, 130, and 140 represents the channel change, the codebook may be changed according to the preferred codeword selected by each of the users 120, 130, and 140.

According to various embodiments, a base station and a terminal may use a basic codebook as a fixed codebook. The size of the basic codebook may vary, for example, the size of the basic codebook may be 4 bits, 6 bits, 8 bits, and the like. When the base station and the terminal use the basic codebook, the terminal may select a preferred codeword from the fixed basic codebook, and feed back information associated with the selected preferred codeword to the base station. For example, the terminal may feed back information associated with an index of the preferred codeword. The base station may extract the preferred codeword from the basic codebook based on the information that is fed back. By limiting the size of the basic codebook, the basic codebook may include a limited number of codewords. In this example, codewords of the basic codebook may quantize a rather large space that may cause the basic codebook to have a relatively high quantization error.

When the base station and the terminal adaptively change the codebook, the base station and the terminal may adaptively generate and use a polar cap codebook. The polar cap codebook may be generated by quantizing a relatively small space in comparison to the basic codebook, and thus may have a relatively lower quantization error.

For example, if a previous preferred codeword is measured by a terminal, for example, a channel vector or a channel matrix between the base station and the terminal, the base station and the terminal may configure the polar cap codebook around the previous preferred codeword. In this example, the probability that the channel vector or the channel matrix is located adjacent to codewords of the polar cap codebook at a subsequent time is relatively high. Accordingly, the base station and the terminal may decrease the quantization error by employing a polar cap codebook that may be adaptively generated and be modified.

The base station and the terminal may generate a subsequent polar cap codebook by rotating a reference codebook by an angle corresponding to a previous preferred codeword. The reference codebook may include the polar cap codebook, or may further include another codebook. According to various embodiments, the reference codebook may further include codewords of a discrete Fourier Transform (DFT) codebook.

Figure 2:
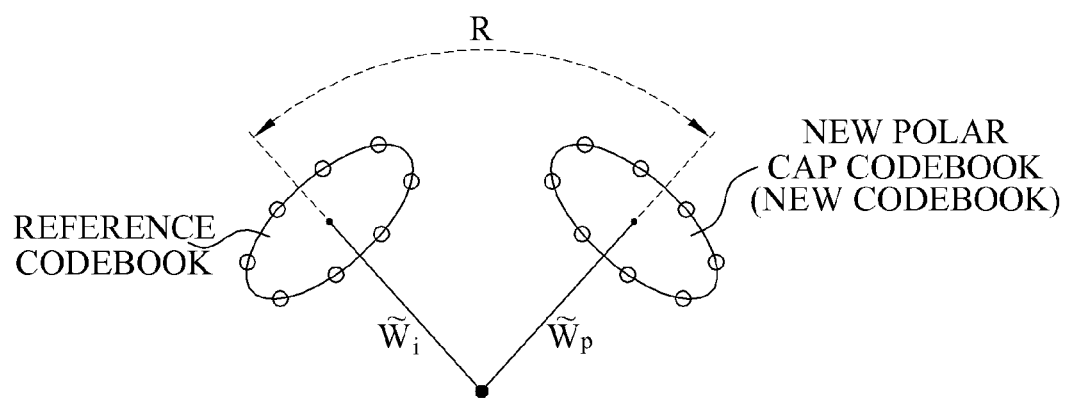
FIG. 2 is a diagram illustrating an example of a reference codebook including a polar cap codebook and a newly generated polar cap codebook.

FIG. 2 illustrates an example of a reference codebook including a polar cap codebook and a newly generated polar cap codebook. The newly generated polar cap codebook may be generated by rotating the reference codebook.

Referring to FIG. 2, $\tilde{w}_p$ denotes a previous preferred codeword selected by a terminal. The previous preferred codeword $\tilde{w}_p$ may be one or more codewords included in a basic codebook.

When the previous preferred codeword $\tilde{w}_p$ is determined, the new polar cap codebook may be configured around the previous preferred codeword $\tilde{w}_p$. To generate the new polar cap codebook, a base station and the terminal may rotate the reference codebook by an angle between the previous preferred codeword $\tilde{w}_p$ and a reference codeword $\tilde{w}_i$.

In this example, a rotation matrix generated by rotating the reference codeword $\tilde{w}_i$ using the previous preferred codeword $\tilde{w}_p$ is referred to as R. In this example, $\tilde{w}_p = R\tilde{w}_i$. When codewords of the reference codebook are $\tilde{w}_f(\tilde{w}_i)$, and codewords of the new polar cap codebook are $\tilde{w}_f(\tilde{w}_p)$, a relationship between the reference codebook and the new polar cap codebook may be expressed as shown in Equation 1.

$$\tilde{w}_f(\tilde{w}_p) = R\tilde{w}_f(\tilde{w}_i) \qquad \text{[Equation 1]}$$

In Equation 1, because the codewords $\tilde{w}_f(\tilde{w}_i)$ of the reference codebook are known, R may be obtained from $\tilde{w}_p = R\tilde{w}_i$ to generate the new polar cap codebook. R may be calculated according to Equation 2.

$$R = [\tilde{w}_p \ \tilde{w}_p^{\perp}][\tilde{w}_i \ \tilde{w}_i^{\perp}]^H \qquad \text{[Equation 2]}$$

In Equation 2, $[\tilde{w}_p \ \tilde{w}_p^{\perp}]$ refers to a unitary matrix associated with $\tilde{w}_p$, $[\tilde{w}_i \ \tilde{w}_i^{\perp}]$ refers to a unitary matrix associated with $\tilde{w}_i$, and H refers to a Hermitian.

The base station and the terminal may be aware of $\tilde{w}_i$ and $\tilde{w}_p$. Accordingly, the base station and the terminal may calculate $[\tilde{w}_p \ \tilde{w}_p^{\perp}]$ and $[\tilde{w}_i \ \tilde{w}_i^{\perp}]$, and may calculate the rotation matrix R. The base station and the terminal may obtain the new polar cap codebook according to Equation 1.

In this example, the reference codeword $\tilde{w}_i$ of the reference codebook may be expressed as shown in Equation 3.

$$\tilde{w}_i = [1 \ 0 \ 0 \ 0]^T \qquad \text{[Equation 3]}$$

$[\tilde{w}_i \ \tilde{w}_i^{\perp}]$ may be provided in a 4×4 identity matrix. In this example, the rotation matrix R may be expressed as shown in Equation 4.

$$R = [\tilde{w}_p \ \tilde{w}_p^{\perp}] \begin{bmatrix} 1 & 0 & 0 & 0 \\ 0 & 1 & 0 & 0 \\ 0 & 0 & 1 & 0 \\ 0 & 0 & 0 & 1 \end{bmatrix} = [\tilde{w}_p \ \tilde{w}_p^{\perp}] \qquad \text{[Equation 4]}$$

In Equation 4, the rotation matrix R may have a relatively efficient performance in spatially uncorrelated channels, however, the rotation matrix R may be unsuitable for spatially correlated channels.

The DFT codebook is described herein, and it is assumed here that the reference codebook includes codewords of the DFT codebook. The codewords of the DFT codebook may be frequently selected as a preferred codeword in the spatially correlated channels.

When one of the codewords of the DFT codebook, for example, $[1 \ e^{j\phi\pi} \ e^{j2\phi\pi} \ e^{j3\phi\pi}]^T$ is rotated through the rotation matrix R, a codeword rotated as an element of a new codebook may be expressed as shown in Equation 5.

$$R \begin{bmatrix} 1 \\ e^{j\phi\pi} \\ e^{j2\phi\pi} \\ e^{j3\phi\pi} \end{bmatrix} = [\tilde{w}_p \ \tilde{w}_p^\perp] \begin{bmatrix} 1 \\ e^{j\phi\pi} \\ e^{j2\phi\pi} \\ e^{j3\phi\pi} \end{bmatrix} \quad \text{[Equation 5]}$$

In this example, $[\tilde{w}_p \ \tilde{w}_p^\perp]$ may be a diagonal matrix that allows the rotated codeword included in the new codebook to remain as an element of the DFT codebook. For example, when the rotated codeword is expressed as shown in Equation 6, the rotated codeword may be an element of the DFT codebook in the new codebook.

$$R \begin{bmatrix} 1 \\ e^{j\phi\pi} \\ e^{j2\phi\pi} \\ e^{j3\phi\pi} \end{bmatrix} = \begin{bmatrix} 1 & 0 & 0 & 0 \\ 0 & e^{j\theta\pi} & 0 & 0 \\ 0 & 0 & e^{j2\theta\pi} & 0 \\ 0 & 0 & 0 & e^{j3\theta\pi} \end{bmatrix} \begin{bmatrix} 1 \\ e^{j\phi\pi} \\ e^{j2\phi\pi} \\ e^{j3\phi\pi} \end{bmatrix} \quad \text{[Equation 6]}$$

$$= \begin{bmatrix} 1 \\ e^{j(\phi+\theta)\pi} \\ e^{j2(\phi+\theta)\pi} \\ e^{j3(\phi+\theta)\pi} \end{bmatrix}$$

$[\tilde{w}_p \ \tilde{w}_p^\perp]$ may not be a diagonal matrix as shown in Equation 6. Accordingly, it may be inappropriate to apply the rotation matrix R of Equation 4 to the codewords of the DFT codebook. When the codewords of the DFT codebook is rotated using the rotation matrix R of Equation 4, the rotated codewords may not be included as elements in the new codebook. This may be ineffective because a preferred DFT codebook may not be used in the spatially correlated channels.

Figure 3:
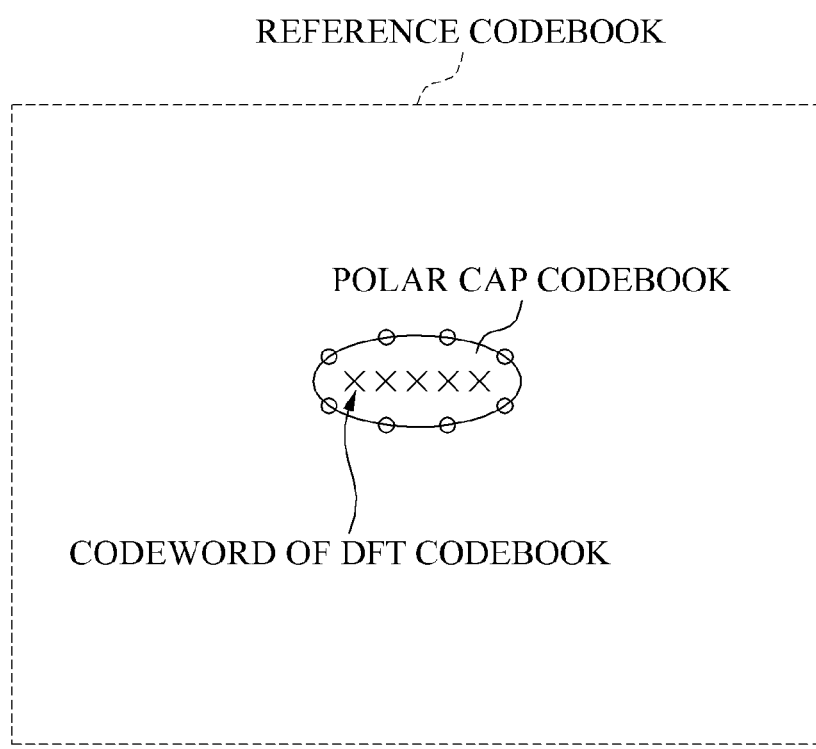
FIG. 3 is a diagram illustrating an example of a reference codebook including codewords of a discrete Fourier transform (DFT) codebook and codewords of a polar cap codebook.

FIG. 3 illustrates an example of a reference codebook including codewords of a DFT codebook and codewords of a polar cap codebook.

Referring to FIG. 3, the reference codebook may include codewords of the polar cap codebook, described with reference to FIG. 2, and codewords of the DFT codebook. In FIG. 3, "x" denotes a codeword of the DFT codebook. In FIG. 3, it is assumed that the reference codebook includes five codewords of the DFT codebook and eight codewords of the polar cap codebook.

When a DFT codebook $\Upsilon$ includes $2^B$ DFT matrices and a number of transmit antennas installed in a base station is $n_t$, the DFT codebook $\Upsilon$ may be expressed as shown in Equation 7.

$$\Upsilon = \{F^{(0)} \ \ldots \ F^{(2^B-1)}\} \quad \text{[Equation 7]}$$

$$F^{(b)} = [f_0^{(b)} \ \ldots \ f_{n_t-1}^{(b)}]$$

$$f_m^{(b)} = \frac{1}{\sqrt{n_t}} [f_{0m}^{(b)} \ \ldots \ f_{(n_t-1)m}^{(b)}]$$

$$f_{nm}^{(b)} = \frac{1}{\sqrt{n_t}} \exp\left\{ j \frac{2\pi n}{n_t} \left( m + \frac{b}{2^B} \right) \right\}$$

As described above, the codewords of the DFT codebook have a line-of-site characteristic allowing for more efficient performance in the spatially correlated channels. Accordingly, when the reference codebook includes the codewords of the DFT codebook as shown in FIG. 3, the rotated codewords of the DFT codebook, included in the new codebook, may include elements of the DFT codebook in order to achieve more efficient performance in the spatially correlated channels.

Figure 4:
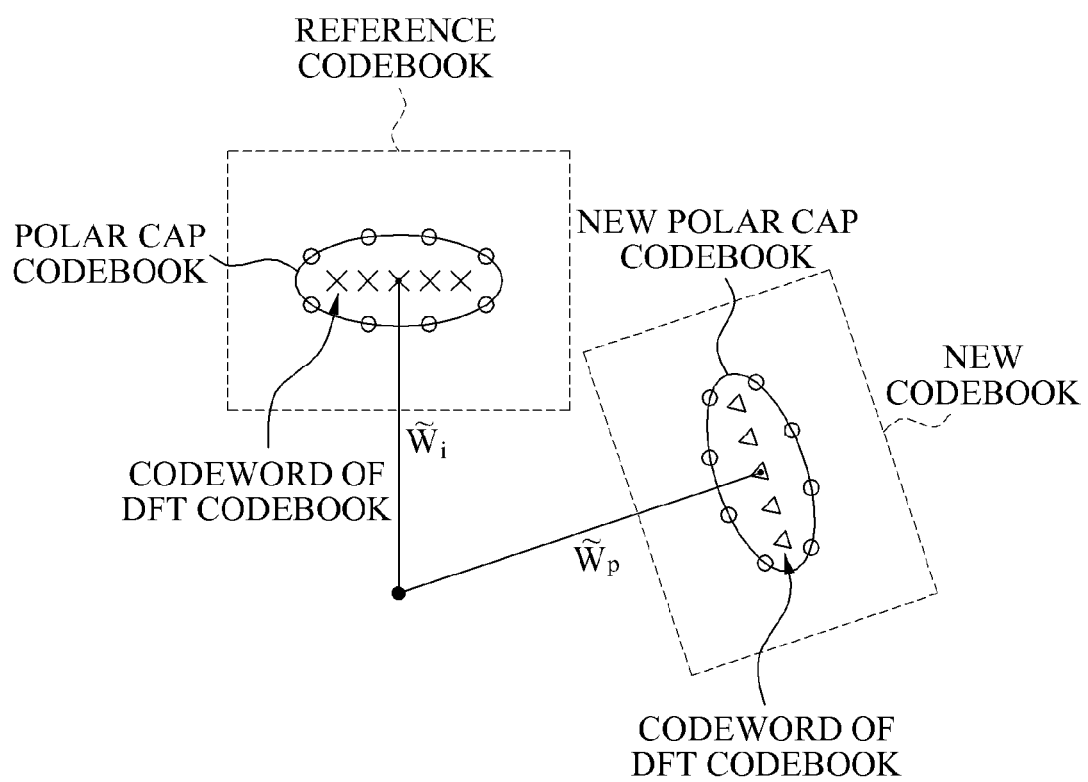
FIG. 4 is a diagram illustrating an example of a reference codebook and a newly generated reference codebook.

FIG. 4 illustrates an example of a reference codebook and a newly generated codebook. The newly generated codebook may be generated by rotating the reference codebook.

Referring to FIG. 4, the reference codebook may include codewords of a DFT codebook and codewords of a polar cap codebook. According to various embodiments, a base station and a terminal may select, as a reference codeword $\tilde{w}_i$ of the reference codebook, a random codeword from among the codewords included in the DFT codebook. The reference codeword $\tilde{w}_i$ may be $$\tilde{w}_i = \frac{1}{\sqrt{4}} [1 \ e^{j\phi_i\pi} \ e^{j2\phi_i\pi} \ e^{j3\phi_i\pi}]^T.$$

For ease of description, the reference codeword $\tilde{w}_i$ may be predefined as shown in Equation 8.

$$\tilde{w}_i = \frac{1}{\sqrt{4}} [1 \ e^{j\phi_i\pi} \ e^{j2\phi_i\pi} \ e^{j3\phi_i\pi}]^T = \frac{1}{\sqrt{4}} [1 \ 1 \ 1 \ 1]^T \quad \text{[Equation 8]}$$

$[\tilde{w}_i \ \tilde{w}_i^\perp]$ may be calculated according to Equation 9.

$$[\tilde{w}_i \ \tilde{w}_i^\perp] = \frac{1}{\sqrt{4}} \begin{bmatrix} 1 & 0 & 0 & 0 \\ 0 & e^{j\phi_i\pi} & 0 & 0 \\ 0 & 0 & e^{j2\phi_i\pi} & 0 \\ 0 & 0 & 0 & e^{j3\phi_i\pi} \end{bmatrix} \cdot \quad \text{[Equation 9]}$$

$$\begin{bmatrix} 1 & 1 & 1 & 1 \\ 1 & j & -1 & -j \\ 1 & -1 & 1 & -1 \\ 1 & -j & -1 & j \end{bmatrix}$$

$$= \begin{bmatrix} 0.5 & 0 & 0 & 0 \\ 0 & 0.5 & 0 & 0 \\ 0 & 0 & 0.5 & 0 \\ 0 & 0 & 0 & 0.5 \end{bmatrix} \cdot \begin{bmatrix} 1 & 1 & 1 & 1 \\ 1 & j & -1 & -j \\ 1 & -1 & 1 & -1 \\ 1 & -j & -1 & j \end{bmatrix}$$

$$= \begin{bmatrix} 1 & 0 & 0 & 0 \\ 0 & 1 & 0 & 0 \\ 0 & 0 & 1 & 0 \\ 0 & 0 & 0 & 1 \end{bmatrix} \frac{1}{2} \begin{bmatrix} 1 & 1 & 1 & 1 \\ 1 & j & -1 & -j \\ 1 & -1 & 1 & -1 \\ 1 & -j & -1 & j \end{bmatrix}$$

$$= F^{(0)}$$

In Equation 9, $F^{(0)}$ may be determined according to Equation 7.

Generally, $[\tilde{w}_i \ \tilde{w}_i^\perp]$ may be calculated according to Equation 9-1.

$$[\tilde{w}_i \ \tilde{w}_i^\perp] = \text{diag}(\tilde{w}_i) \begin{bmatrix} 1 & 1 & 1 & 1 \\ 1 & j & -1 & -j \\ 1 & -1 & 1 & -1 \\ 1 & -j & -1 & j \end{bmatrix} \quad \text{[Equation 9-1]}$$

In Equation 9-1, $\tilde{w}_i$ refers to a unit vector, an $n^{th}$ element of $\tilde{w}_i$ is $x_n$, and an $(n, m)^{th}$ element located in an $n^{th}$ row and an $m^{th}$ column of $[\tilde{w}_i \ \tilde{w}_i^\perp]$ is $$x_n \exp\left\{ j\frac{2\pi}{N_t}(n-1)(m-1) \right\}.$$

Because $[\tilde{w}_i \ \tilde{w}_i^\perp]$ may be predefined, a codebook may be designed based on the predefined $[\tilde{w}_i \ \tilde{w}_i^\perp]$.

The previous preferred codeword $\tilde{w}_p$ may be a codeword of the DFT codebook, or may not be the codeword of the DFT codebook.

When the previous preferred codeword $\tilde{w}_p$ corresponds to the codeword of the DFT codebook, the previous preferred codeword $\tilde{w}_p$ may be expressed by $$\tilde{w}_p = \frac{1}{\sqrt{4}}[1 \ e^{j\phi_p \pi} \ e^{j2\phi_p \pi} \ e^{j3\phi_p \pi}]^T.$$

In this example, $[\tilde{w}_p \ \tilde{w}_p^\perp]$ may be expressed as shown in Equation 10.

$$[\tilde{w}_p \ \tilde{w}_p^\perp] = \text{diag}(\tilde{w}_p) \cdot \begin{bmatrix} 1 & 1 & 1 & 1 \\ 1 & j & -1 & -j \\ 1 & -1 & 1 & -1 \\ 1 & -j & -1 & j \end{bmatrix} \quad \text{[Equation 10]}$$

$$= 2\text{diag}(\tilde{w}_p) \cdot F^{(0)}$$

$$= \begin{bmatrix} 1 & 0 & 0 & 0 \\ 0 & e^{j\phi_p \pi} & 0 & 0 \\ 0 & 0 & e^{j2\phi_p \pi} & 0 \\ 0 & 0 & 0 & e^{j3\phi_p \pi} \end{bmatrix} \frac{1}{2} \begin{bmatrix} 1 & 1 & 1 & 1 \\ 1 & j & -1 & -j \\ 1 & -1 & 1 & -1 \\ 1 & -j & -1 & j \end{bmatrix}$$

In Equation 10, diag(X) refers to a diagonal matrix that includes elements of X as diagonal elements and includes "zero" as the remaining elements, excluding the diagonal elements. For example, when $X = [1, 2, 3, 4]^T$, diag(X) refers to the diagonal matrix and diagonal elements of diag(X) include 1, 2, 3, and 4.

When the previous preferred codeword $\tilde{w}_p$ corresponds to the codeword of the DFT codebook, $[\tilde{w}_p \ \tilde{w}_p^\perp]$ may be a unitary matrix according to Equation 10. The rotation matrix R may be provided in a form of a diagonal matrix as expressed in Equation 11.

$$R = [\tilde{w}_p \ \tilde{w}_p^\perp][\tilde{w}_i \ \tilde{w}_i^\perp]^H \quad \text{[Equation 11]}$$

$$= 2\text{diag}(\tilde{w}_p) \cdot F^{(0)} F^{(0)H}$$

$$= \begin{bmatrix} 1 & 0 & 0 & 0 \\ 0 & e^{j\phi_p \pi} & 0 & 0 \\ 0 & 0 & e^{j2\phi_p \pi} & 0 \\ 0 & 0 & 0 & e^{j3\phi_p \pi} \end{bmatrix}$$

When the previous preferred codeword $\tilde{w}_p$ corresponds to the codeword of the DFT codebook, the rotation matrix R may be provided in the form of the diagonal matrix, and may include phase information $\phi_p$ associated with $\tilde{w}_p$. Accordingly, when codewords of the DFT codebook, included in the reference codebook, are rotated using the rotation matrix R, the rotated codewords may be expressed as elements of the DFT codebook as shown in Equation 6. Also, codewords of the polar cap codebook, included in the reference codebook, may be rotated using the rotation matrix R and the properties of the polar cap codebook may be maintained as is.

Alternatively, when the previous preferred codeword $\tilde{w}_p$ does not correspond to the codeword of the DFT codebook, $[\tilde{w}_p \ \tilde{w}_p^\perp]$ may be calculated according to a scheme slightly different from Equation 10. For example, a Gram-Schmidt orthogonalization may be applied to $$\text{diag}(\tilde{w}_p) \cdot \begin{bmatrix} 1 & 1 & 1 & 1 \\ 1 & j & -1 & -j \\ 1 & -1 & 1 & -1 \\ 1 & -j & -1 & j \end{bmatrix}.$$

When applying the Gram-Schmidt orthogonalization, to "x" such as Gram_Schmidt(x), $[\tilde{w}_p \ \tilde{w}_p^\perp]$ may be expressed as shown in Equation 12.

$$[\tilde{w}_p \ \tilde{w}_p^\perp] = \text{Gram\_Schmidt}\left( \text{diag}(\tilde{w}_p) \cdot \begin{bmatrix} 1 & 1 & 1 & 1 \\ 1 & j & -1 & -j \\ 1 & -1 & 1 & -1 \\ 1 & -j & -1 & j \end{bmatrix} \right) \quad \text{[Equation 12]}$$

$$= \text{Gram\_Schmidt}(2\text{diag}(\tilde{w}_p) \cdot F^{(0)})$$

The Gram-Schmidt orthogonalization may be configured as follows. In general, a rotation matrix $Q_{F_{\tau-1}}$ of $F_{\tau-1}$ may be expressed as shown in Equation 12-1.

$$Q_{F_{\tau-1}} = [F_{\tau-1} \ F_{\tau-1}^\perp][w_b \ w_b^\perp]^H \quad \text{[Equation 12-1]}$$

In Equation 12-1, each of $F_{\tau-1}^\perp$ and $w_b^\perp$ may include columns having a unit norm. Columns of each of $F_{\tau-1}^\perp$ and $w_b^\perp$ may be orthogonal to columns of each of $F_{\tau-1}$ and $w_b$. As described herein, a superscript H refers to a conjugate transpose of a vector or a matrix.

In an example including four transmit antennas and a transmission rank 1, a process of extracting $[F_{\tau-1} \ F_{\tau-1}^\perp]$ and $[w_b \ w_b^\perp]$ to obtain $Q_{F_{\tau-1}}$ may be performed. In this example, one of $[F_{\tau-1} \ F_{\tau-1}^\perp]$ and $[w_b \ w_b^\perp]$ may be defined as a general matrix $R_x$. In this example, "x" refers to a unit vector, and an $(n, m)^{th}$ entry of x may be given according to Equation 12-2.

$$x_n \exp\left\{ j\frac{2\pi}{n_t}(n-1)(m-1) \right\} \quad \text{[Equation 12-2]}$$

In Equation 12-2, each of "n" and "m" refer to natural numbers within the range of 1 to $n_t$, and $x_n$ denotes an $n^{th}$ element of "x." When entries of the unit vector "x" have the same magnitude, $R_x$ may be a unitary matrix. Otherwise, the Gram-Schmidt orthogonalization may be applicable to $R_x$ to obtain the unitary matrix. $R_x$ may be expressed by Equation 12-3.

$$R_x = \text{diag}(x) \begin{bmatrix} 1 & 1 & 1 & 1 \\ 1 & j & -1 & -j \\ 1 & -1 & 1 & -1 \\ 1 & -j & -1 & j \end{bmatrix} \quad \text{[Equation 12-3]}$$

The diag(x) operator may generate a diagonal matrix, and diagonal entries of the diagonal matrix may be given by a vector "x". When $$w_b = \frac{1}{\sqrt{4}}[1 \quad 1 \quad 1 \quad 1]^T$$

is fixed and $x=w_b$, $R_{w_b}$ may be expressed as shown in Equation 12-4.

$$R_{w_b} = [w_b \quad w_b^\perp] \quad \text{[Equation 12-4]}$$

$$= \frac{1}{\sqrt{4}}\text{diag}([1, 1, 1, 1])\begin{bmatrix} 1 & 1 & 1 & 1 \\ 1 & j & -1 & -j \\ 1 & -1 & 1 & -1 \\ 1 & -j & -1 & j \end{bmatrix}$$

$$= \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}$$

When entries of the unit vector $F_{\tau-1}$ have a constant magnitude, a rotation matrix $Q_{F_{\tau-1}}$ of $F_{\tau-1}$ may be obtained according to Equation 12-5.

$$Q_{F_{\tau-1}} = R_{F_{\tau-1}} R_{w_b}^H = 2\text{diag}(F_{\tau-1}) \quad \text{[Equation 12-5]}$$

With respect to $F_{\tau-1}$, the Gram-Schmidt orthogonalization may be applied to $R_{F_{\tau-1}}$ to obtain $Q_{F_{\tau-1}}$. In this example, $R_{F_{\tau-1}}$ may be expressed as shown in Equation 12-6.

$$R_{F_{\tau-1}} = \text{diag}(F_{\tau-1})\begin{bmatrix} 1 & 1 & 1 & 1 \\ 1 & j & -1 & -j \\ 1 & -1 & 1 & -1 \\ 1 & -j & -1 & j \end{bmatrix} \quad \text{[Equation 12-6]}$$

$$= [F_{\tau-1} \quad c_2 \quad c_3 \quad c_4]$$

The Gram-Schmidt orthogonalization may be applied in $c_2$ as expressed by Equation 12-7.

$$m_2 = c_2 - [F_{\tau-1}^H c_2] F_{\tau-1} \quad \text{[Equation 12-7]}$$

After a normalization, the normalization may be applied according to $$d_2 = \frac{m_2}{\|m_2\|}.$$

The variables $d_3$ and $d_4$ may be expressed as a function of $d_2$ as shown below.

$$m_3 = c_3 - [F_{\tau-1}^H c_3] F_{\tau-1} - [d_2^H c_3] d_2$$

$$d_3 = \frac{m_3}{\|m_3\|}$$

$$m_4 = c_4 - [F_{\tau-1}^H c_4] F_{\tau-1} - [d_2^H c_4] d_2 - [d_3^H c_4] d_3$$

$$d_4 = \frac{m_4}{\|m_4\|}$$

The rotation matrix $Q_{F_{\tau-1}}$ may be obtained according to Equation 12-8.

$$Q_{F_{\tau-1}} = [F_{\tau-1} \, d_2 \, d_3 \, d_4] \cdot R_{w_b}^H \quad \text{[Equation 12-8]}$$

The Gram-Schmidt orthogonalization is described above, accordingly, a description of such is omitted here.

The base station and the terminal may calculate the rotation matrix R according to Equation 2 and Equation 9. The base station and the terminal may rotate the reference codebook using the calculated rotation matrix R.

According to various embodiments, the base station and the terminal may select, as the reference codeword $\tilde{w}_i$ of the reference codebook, a random codeword from among the codewords included in the DFT codebook. Accordingly, the above descriptions may be applicable to a DFT codebook. In the example shown in FIG. 4, the triangles shown in the new codebook represent elements of the DFT codebook.

Figure 5:
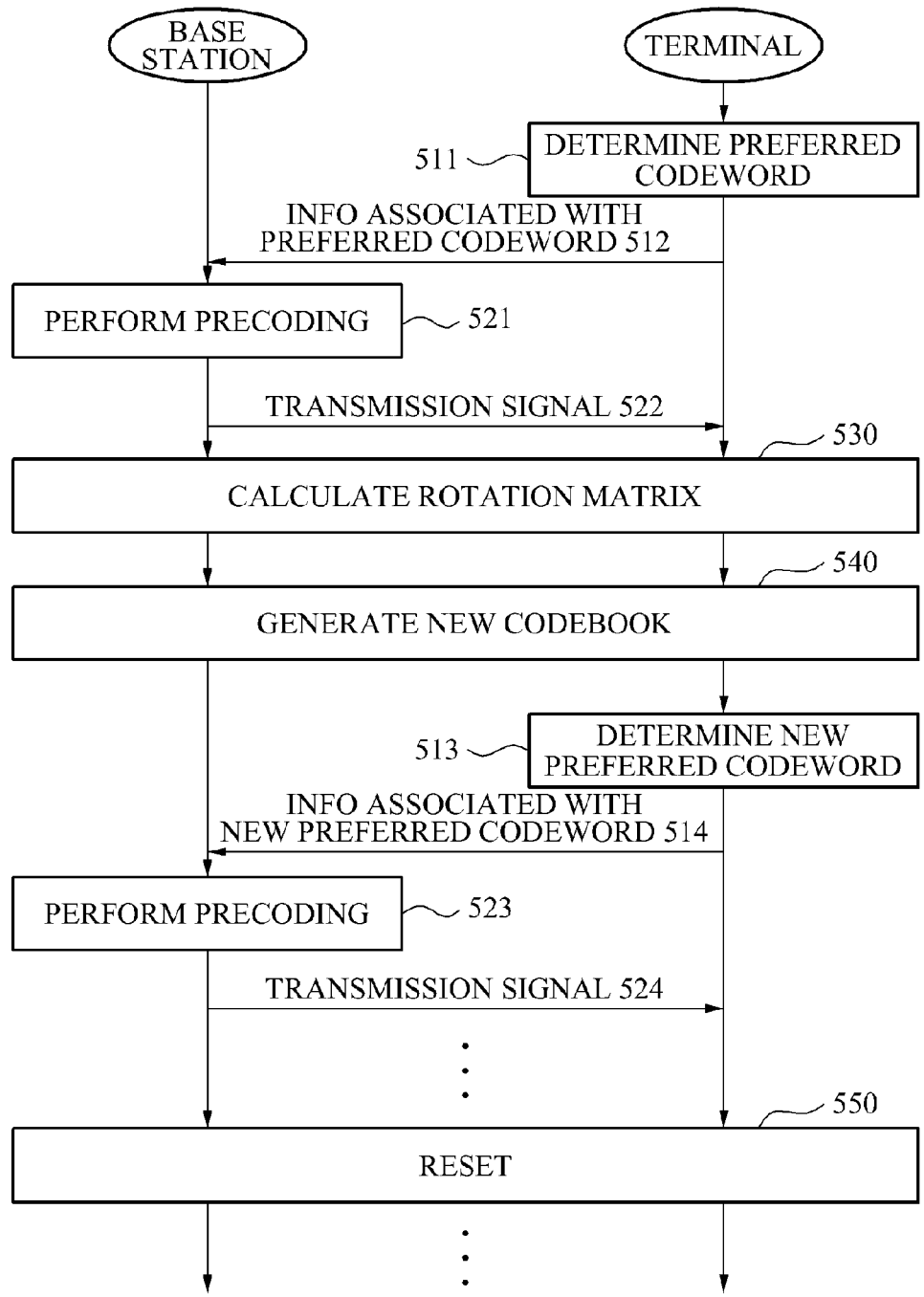
FIG. 5 is a flowchart illustrating an example of a method for a base station and a terminal.

FIG. 5 illustrates an example of a method for a base station and a terminal.

In operation 511, the terminal estimates a channel based on a known signal and selects a preferred codeword from a basic codebook based on the estimated channel.

In operation 512, the terminal feeds back information associated with the determined preferred codeword to the base station.

The base station may verify the selected preferred codeword based on information associated with the preferred codeword, and may generate a precoding matrix based on the preferred codeword. In operation 521, the base station precodes at least one data stream using the precoding matrix.

In operation 522, the base station transmits a transmission signal to the terminal via a plurality of transmit antennas.

In operation 530, each of the base station and the terminal calculates a rotation matrix based on the preferred codeword $\tilde{w}_p$ that is selected in operation 511.

For example, when the previous preferred codeword $\tilde{w}_p$ corresponds to an element of a DFT codebook, each of the base station and the terminal may calculate $[\tilde{w}_p \; \tilde{w}_p^\perp]$ according to Equation 13.

$$[\tilde{w}_p \; \tilde{w}_p^\perp] \begin{bmatrix} \tilde{\omega}_{p1} & \cdots & \cdots \\ \cdots & \tilde{\omega}_{pn}\exp\left\{j\frac{2\pi}{n_t}(n-1)(m-1)\right\} & \cdots \\ \tilde{\omega}_{pn_t} & \cdots & \cdots \end{bmatrix} \quad \text{[Equation 13]}$$

In Equation 13, $\tilde{w}_{pn}$ refers to an $n^{th}$ element of $\tilde{w}_p$, "n" refers to an $n^{th}$ row of $[\tilde{w}_p \; \tilde{w}_p^\perp]$, "m" refers to an $m^{th}$ column of $[\tilde{w}_p \; \tilde{w}_p^\perp]$, and $n_t$ refers to the number of transmit antennas.

Conversely, when the previous preferred codeword $\tilde{w}_p$ does not correspond to the element of the DFT codebook, each of the base station and the terminal may calculate $[\tilde{w}_p \; \tilde{w}_p^\perp]$ by orthogonalizing a matrix as shown in Equation 14.

$$\begin{bmatrix} \tilde{\omega}_{p1} & \cdots & \cdots \\ \cdots & \tilde{\omega}_{pn}\exp\left\{j\frac{2\pi}{n_t}(n-1)(m-1)\right\} & \cdots \\ \tilde{\omega}_{pn_t} & \cdots & \cdots \end{bmatrix} \quad \text{[Equation 14]}$$

In addition, each of the base station and the terminal may set, as a reference codeword $\tilde{w}_i$, a random codeword from among codewords included in the DFT codebook. Each of the base station and the terminal may calculate $[\tilde{w}_i \; \tilde{w}_i^\perp]$ according to Equation 9.

When $[\tilde{w}_p \; \tilde{w}_p^\perp]$ and $[\tilde{w}_i \; \tilde{w}_i^\perp]$ are calculated, each of the base station and the terminal may calculate the rotation matrix R according to Equation 2.

When the rotation matrix R is calculated, in operation 540, each of the base station and the terminal generates a new codebook by $\tilde{w}_f(\tilde{w}_p)$ rotating codewords $\tilde{w}_f(\tilde{w}_i)$ of a reference codebook using the rotation matrix R, as expressed in Equation 1.

The terminal determines a new preferred codeword based on the new codebook $\tilde{w}_f(\tilde{w}_p)$ in operation 513, and feeds back, to the base station, information associated with the new preferred codeword in operation 514.

In operation 523, the base station extracts a new preferred codeword from the new codebook $\tilde{w}_f(\tilde{w}_p)$ based on information associated with the new preferred codeword, and generates a new precoding matrix.

In operation 524, the base station generates a new transmission signal by performing precoding using the new precoding matrix.

Operations 530 through 524 may be repeated at least once. For example, each of the terminal and the base station may generate the new codebook based on the previous preferred codeword. The terminal may determine the new preferred codeword based on the new codebook, and the base station may perform precoding using the new codebook.

When the process of operations 530 through 524 is repeated a predetermined number of times, or when a predetermined amount of time is elapsed, a codebook used in the base station and the terminal may be reset to a basic codebook in operation 550. In this example, each of the base station and the terminal may sequentially update the used codebook according to the aforementioned process.

As described above, the terminal may select, as the new preferred codeword, one of codewords of the new codebook $\tilde{w}_f(\tilde{w}_p)$, and may feed back, to the base station, information associated with the new preferred codeword. In this example, the terminal may not necessarily fully generate the new codebook $\tilde{w}_f(\tilde{w}_p)$. This is because the terminal may select one of codewords of the reference codebook $\tilde{w}_f(\tilde{w}_i)$, which is equivalent to selecting the new preferred codeword.

For example, the terminal may generate the new codebook $\tilde{w}_f(\tilde{w}_p)$, and then may select, as the new preferred codeword, one of codewords of the new codebook $\tilde{w}_f(\tilde{w}_p)$. Without generating the new codebook $\tilde{w}_f(\tilde{w}_p)$, the terminal may express the new preferred codeword as one of the codewords of the reference codebook $\tilde{w}_f(\tilde{w}_i)$. The terminal may feed back, to the base station, information associated with the new preferred codeword. The information fed back may include, for example, information associated with an index of the new preferred codeword in the new codebook $\tilde{w}_f(\tilde{w}_p)$, or information associated with an index of a codeword corresponding to the new preferred codeword in the reference codebook $\tilde{w}_f(\tilde{w}_i)$. Because $\tilde{w}_f(\tilde{w}_p)=R\tilde{w}_f(\tilde{w}_i)$, the new preferred codeword may be expressed as an index of one of the codewords included in the new codebook $\tilde{w}_f(\tilde{w}_p)$, or may be expressed as an index of one of the codewords included in the reference codebook $\tilde{w}_f(\tilde{w}_i)$. In the example where the terminal generates information associated with the new preferred codeword from the new codebook $\tilde{w}_f(\tilde{w}_p)$, and in the example where the terminal generates information associated with the new preferred codeword from the reference codebook $\tilde{w}_f(\tilde{w}_i)$, the base station may regenerate the rotation matrix R. Accordingly, the base station may verify the corresponding new preferred codeword based on information associated with the new preferred codeword that is fed back from the terminal.

Descriptions made above with reference to FIG. 1 through FIG. 5 may be applicable to an "explicit feedback" that is described further herein.

Referring to FIG. 5 and the aforementioned description, the base station and the terminal may calculate a rotation matrix. In this example, and according to various embodiments, the base station and the terminal may determine or select the rotation matrix by selecting candidates pre-stored in a memory, instead of fully calculating the rotation matrix. Hereinafter, examples of the base station and the terminal pre-storing a plurality of candidates in the memory and "selecting" a "rotation matrix" from the pre-stored candidates are described.

A receiver may estimate a channel between the receiver and a transmitter, and determine a preferred codeword from a basic codebook. Information associated with the preferred codeword may be shared by the transmitter and the receiver. When the receiver selects a new preferred codeword suitable for a changed channel, the rotation matrix may be determined. The receiver may calculate the rotation matrix, and may also select an optimal rotation matrix from a plurality of candidates pre-stored in the memory.

The candidates pre-stored in the memory may be based on codewords of a DFT codebook. For example, when $N_t=4$, each of the candidates may be provided in a form of $$\begin{bmatrix} 1 & 0 & 0 & 0 \\ 0 & e^{j\theta\pi} & 0 & 0 \\ 0 & 0 & e^{j2\theta\pi} & 0 \\ 0 & 0 & 0 & e^{j3\theta\pi} \end{bmatrix}.$$

For example, each of the candidates pre-stored in the memory may be a diagonal matrix including elements of the codewords of the DFT codebook as diagonal elements. Also, each of the candidates pre-stored in the memory may be represented with respect to $N_t=8$, 16, and the like.

The receiver may feed back, to the transmitter, information associated with an index of the selected rotation matrix. The transmitter may verify the rotation matrix based on the fed back information. The transmitter may generate a new codebook or verify a new preferred codeword by rotating a reference codebook using the rotation matrix.

Figure 6:
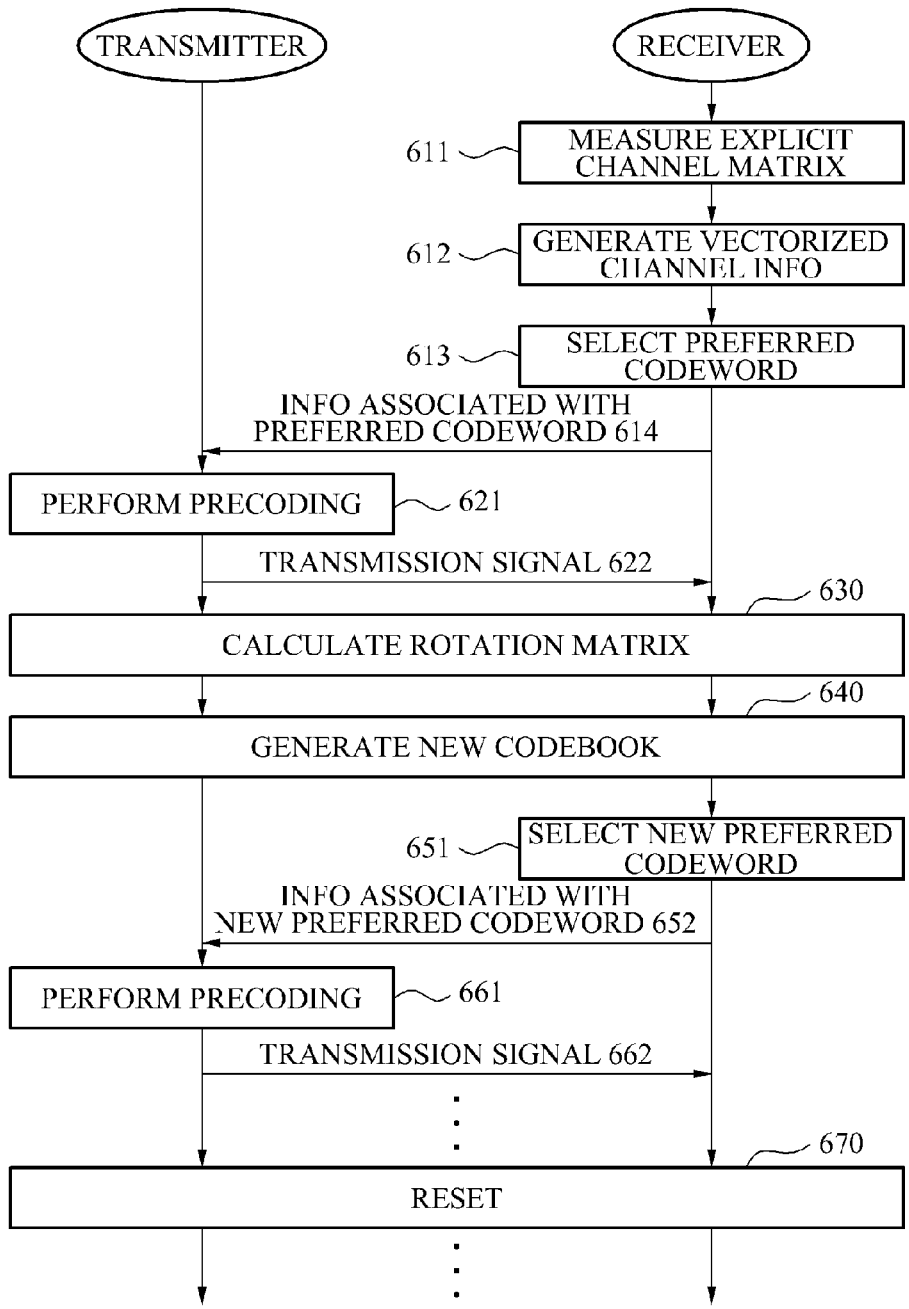
FIG. 6 is a flowchart illustrating an example of a method for a receiver and a transmitter selecting a preferred codeword.

FIG. 6 illustrates an example of a method for a receiver and a transmitter selecting a preferred codeword. The preferred codeword may be selected based on an explicit channel matrix or the preferred codeword may be recognized.

In this example, a downlink transmission is illustrated. In a downlink, a base station performs the transmitting and each of terminals performs the receiving.

Generally, each of the terminals may calculate an implicit channel matrix based on a known signal such as a pilot signal that is transmitted from the base station, and each of the terminals may select a preferred codeword based on the implicit channel matrix. The implicit channel matrix refers to a product between an explicit channel matrix and a received beamforming matrix. For example, each of the terminals may measure the implicit channel matrix by performing zero-forcing beamforming, instead of measuring the explicit channel matrix. Zero-forcing beamforming is the product between the received beamforming matrix corresponding to the zero-forcing beamforming and the explicit channel matrix. Each of the terminals may select a preferred codeword from a codebook based on the implicit channel matrix, and may feed back, to the base station, information associated with the selected preferred codeword.

The base station may adaptively change a transmission mode with a high degree of freedom (DOF) by verifying the explicit channel matrix. For example, when the base station may verify the explicit channel matrix, the base station may select one of a single-user MIMO transmission mode, a multi-user MIMO transmission mode, or a transmit diversity transmission mode.

Accordingly, to assign a relatively high DOF to the base station, each of the terminals may select the preferred codeword based on the explicit channel matrix, and feed back information associated with the selected preferred codeword. The base station may recognize the preferred codeword. Accordingly, a codebook used by each of the base station and the terminals may be modified and codebook update technology may also be modified.

To share the explicit channel matrix, a reference codebook may be determined based on codewords of a polar cap codebook and codewords of a DFT codebook and the reference codebook may be used by each of the terminals and the base station.

(1) Polar Cap Codebook $C^{polar}$

When a number of transmit antennas installed in a transmitter is $N_t$, a reference codeword $w_b$ having a dimension of $N_t^2 \times 1$ may be represented by $$\frac{1}{\sqrt{N_t^2}} [1 \quad \cdots \quad 1]^T.$$

For example, the elements of the reference codeword $w_b$ may be $$\frac{1}{\sqrt{N_t^2}}.$$

In this example, a predetermined number of vectors among vectors surrounding the reference codeword $w_b$ may be selected as codewords of the polar cap codebook. Accordingly, the predetermined number of vectors may be selected to maximize minimum distances between the codewords of the polar cap codebook $C^{polar}$.

(2) DFT-Like Codebook $C^{DFT}$ Based on a DFT Codebook

The DFT-like codebook $C^{DFT}$ may be determined based on codewords of a DFT codebook. In the example where $N_t=4$, a plurality of vectors having the form $$\frac{1}{\sqrt{4}} [1 \quad e^{j\phi\pi} \quad e^{j2\phi\pi} \quad e^{j3\phi\pi}],$$

which is a transpose of a codeword included in the DFT codebook, may be represented according to Equation 15, to generate the DFT-like codebook $C^{DFT}$.

$$\frac{1}{\sqrt{4}} [1 \quad e^{j\theta_1} \quad e^{j2\theta_1} \quad e^{j3\theta_1}], \ldots, \quad \text{[Equation 15]}$$

$$\frac{1}{\sqrt{4}} [1 \quad e^{j\theta_M} \quad e^{j2\theta_M} \quad e^{j3\theta_M}]$$

In Equation 15, $\theta_i$ refers to a predefined value.

The vectors of the DFT codebook shown in Equation 15 and a Hermitian of each of the vectors may be multiplied with each other as expressed by Equation 16.

$$vec\left(\frac{1}{\sqrt{4}} [1 \quad e^{j\theta_i} \quad e^{j2\theta_i} \quad e^{j3\theta_i}]^H \cdot \right. \quad \text{[Equation 16]}$$

$$\left. \frac{1}{\sqrt{4}} [1 \quad e^{j\theta_i} \quad e^{j2\theta_i} \quad e^{j3\theta_i}]\right) =$$

$$\frac{1}{4} vec\left(\begin{bmatrix} 1 \\ e^{-j\theta_i} \\ e^{-j2\theta_i} \\ e^{-j3\theta_i} \end{bmatrix} \cdot [1 \quad e^{j\theta_i} \quad e^{j2\theta_i} \quad e^{j3\theta_i}]\right) =$$

$$\frac{1}{4} vec\left(\begin{bmatrix} 1 & e^{j\theta_i} & e^{j2\theta_i} & e^{j3\theta_i} \\ e^{-j\theta_i} & 1 & e^{j\theta_i} & e^{j2\theta_i} \\ e^{-j2\theta_i} & e^{-j\theta_i} & 1 & e^{j\theta_i} \\ e^{-j3\theta_i} & e^{-j2\theta_i} & e^{-j\theta_i} & 1 \end{bmatrix}\right)$$

In Equation 16, $$\frac{1}{4} vec\left(\begin{bmatrix} 1 & e^{j\theta_i} & e^{j2\theta_i} & e^{j3\theta_i} \\ e^{-j\theta_i} & 1 & e^{j\theta_i} & e^{j2\theta_i} \\ e^{-j2\theta_i} & e^{-j\theta_i} & 1 & e^{j\theta_i} \\ e^{-j3\theta_i} & e^{-j2\theta_i} & e^{-j\theta_i} & 1 \end{bmatrix}\right)$$

may be vectorized. Accordingly, the column vectors of the matrix may be unified into a single vector as expressed by Equation 17.

$$\frac{1}{4} vec\left(\begin{bmatrix} 1 & e^{j\theta_i} & e^{j2\theta_i} & e^{j3\theta_i} \\ e^{-j\theta_i} & 1 & e^{j\theta_i} & e^{j2\theta_i} \\ e^{-j2\theta_i} & e^{-j\theta_i} & 1 & e^{j\theta_i} \\ e^{-j3\theta_i} & e^{-j2\theta_i} & e^{-j\theta_i} & 1 \end{bmatrix}\right) = \frac{1}{4}\begin{bmatrix} 1 \\ e^{j\theta_i} \\ e^{j2\theta_i} \\ e^{j3\theta_i} \\ e^{-j\theta_i} \\ 1 \\ e^{j\theta_i} \\ e^{j2\theta_i} \\ e^{-j2\theta_i} \\ e^{-j\theta_i} \\ 1 \\ e^{j\theta_i} \\ e^{-j3\theta_i} \\ e^{-j2\theta_i} \\ e^{-j\theta_i} \\ 1 \end{bmatrix} \quad \text{[Equation 17]}$$

In Equation 17, vec(X) refers to an operation of unifying all the column vectors of the matrix X into a single vector.

The DFT-like codebook $C^{DFT}$ may be represented as a set of 16×1 vectors as shown in Equation 17.

(3) Reference Codebook Based on at Least One of the Polar Cap Codebook $C^{polar}$ and the DFT-Like Codebook $C^{DFT}$ The polar cap codebook $C^{polar}$ and the DFT-like codebook $C^{DFT}$ may be used independently as the reference codebook. The reference codebook may be generated by unifying the polar cap code codebook $C^{polar}$ and the DFT-like codebook $C^{DFT}$. For example, the reference codebook may be determined based on chordal distances between codewords of the polar cap codebook $C^{polar}$ and codewords of the DFT-like codebook $C^{DFT}$. codewords of the DFT-like codebook $C^{DFT}$ may be codewords of a vectorized DFT codebook. Accordingly, the reference codebook may be determined to maxmize the chordal distances.

A reference codebook C may be pre-stored in a receiver and a transmitter. As described above, the reference codebook C may include at least one of the polar cap codebook $C^{polar}$, the DFT-like codebook $C^{DFT}$, and a unification of the polar cap codebook $C^{polar}$ and the DFT-like codebook $C^{DFT}$. The reference codebook C may be updated according to an explicit channel matrix between the transmitter and the receiver.

Referring to FIG. 6, the receiver, for example, a terminal in a downlink or a base station in an uplink, in operation 611 may calculate an explicit channel matrix H, instead of an implicit channel matrix, based on a known signal transmitted from the transmitter. The receiver may select a preferred codeword based on a Hermitian H or by other information, for example, $H^H H$ generated by processing H.

In operation 612, the receiver obtains vectorized channel information by vectorizing the calculated H or $H^H H$. H or $H^H H$ may be vectorized to the vectorized channel information and may be represented as vec(H) or vec($H^H H$). The vectorized channel information may also be $U_i$vec(H) or $U_i$vec($H^H H$). In this example, $U_i$ refers to an $i^{th}$ element among elements included in a set of a unitary matrix. In this example, the channel information generated by the receiver is vec($H^H H$). A dimension of vec(H) may vary depending on a number of receive antennas installed in the receiver, whereas a dimension of vec($H^H H$) may be fixed. Accordingly, in some embodiments it may be more effective to use vec($H^H H$).

When the previous explicit channel matrix between the transmitter and the receiver is H, and vectorized channel information based on the previous explct channel matrix is vec($H^H H$), in operation 613, the receiver selects a previous preferred matrix $V_{vec(H^H H)(t-1)}$ that may be based on a basic codebook or a currently applied codebook. In operation 614, the receiver feeds back, to the transmitter, information associated with the previous preferred matrix $V_{vec(H^H H)(t-1)}$ for example, information associated with an index of the codebook, and the like. The transmitter generates a precoding matrix based on information associated with the previous preferred matrix $V_{vec(H^H H)(t-1)}$ and precodes at least one data stream based on the precoding matrix in operation 621, and generates a transmission signal in operation 622.

The reference codebook may be updated based on the previous preferred matrix $$v_{vec(H^H H)}(t-1).$$

In operation 630, each of the receiver and the transmitter calculates a rotation matrix to update the reference codebook.

Initially, a matrix $R_x$ may be defined based on a unit vector X. In this example, an $(n, m)^{th}$ element located in an $n^{th}$ row and an $m^{th}$ column of $R_x$ is $$x_n \exp\left\{j\frac{2\pi}{N_t}(n-1)(m-1)\right\},$$

where $x_n$ refers to an $n^{th}$ element of X. When all the elements of X have the same magnitude, $R_x$ may be a unitary matrix. Otherwise, a Gram-Schmidt orthogonalization may be applicable to $R_x$.

For example, when X corresponds to a unit vector having a dimension of 4×1, $R_x$ may be expressed as shown in Equation 18.

$$R_x = \mathrm{diag}(x)\begin{bmatrix} 1 & 1 & 1 & 1 \\ 1 & j & -1 & -j \\ 1 & -1 & 1 & -1 \\ 1 & -j & -1 & j \end{bmatrix}. \quad \text{[Equation 18]}$$

In operation 640, the reference codebook C is updated with a new codebook based on the previous preferred matrix $$v_{vec(H^H H)}(t-1)$$

and the reference codeword $w_b$. In this example, a rotation matrix $$Q_{v_{vec(H^H H)}(t-1)}$$

that rotates the reference codebook C to generate the new codebook may be calculated based on the previous preferred matrix $$v_{vec(H^H H)}(t-1)$$

and the reference codeword $w_b$ where $w_b$ is $$\frac{1}{\sqrt{N_t^2}}[1 \;\cdots\; 1]^T,$$

as expressed by Equation 19. The new codebook may be generated by multiplying the rotation matrix $$Q_{v_{vec(H^H H)}(t-1)}$$

and the reference codebook C.

$$Q_{V_{vec(H^H H)}(t-1)} = \left[ V_{vec(H^H H)}(t-1) \;\; V^{\perp}_{vec(H^H H)}(t-1) \right][w_b \;\; w_b^{\perp}]^H \quad \text{[Equation 19]}$$

$$= \mathrm{Gram\_Schmid}\left(R_{V_{vec(H^H H)}}\right)[w_b \;\; w_b^{\perp}]^H$$

In Equation 19, an $(n, m)^{th}$ element located in an $n^{th}$ row and an $m^{th}$ column of $$R_{V_{vec(H^H H)_{is}}} x_n \exp\left\{j\frac{2\pi}{N_t}(n-1)(m-1)\right\},$$

$X_n$ refers to an $n^{th}$ element of $$v_{vec(H^H H)},$$

an $(n, m)^{th}$ element located in an $n^{th}$ row and an $m^{th}$ column of $$[w_b \quad w_b^\perp]$$

is $$w_n \exp\left\{j\frac{2\pi}{N_t}(n-1)(m-1)\right\},$$

and $w_n$ refers to an $n^{th}$ element of $w_b$. In this example, $$[w_b \quad w_b^\perp]$$

may be predefined and may be multiplied in advance by a codebook.

When the rotation matrix $$Q_{v_{vec(H^H H)}}^{(t-1)}$$

is calculated according to Equation 19 and the new codebook is generated, each of the receiver and the transmitter may use the generated new codebook. For example, when the receiver measures again the explicit channel matrix, in operation 651, the receiver selects a new preferred codeword using the new codebook. In operation 652, the receiver feeds back, to the transmitter, information associated with the new preferred codeword containing information associated with an index of the new preferred codeword in the new codebook. In operation 661, the transmitter generates a precoding matrix based on information associated with the new preferred codeword and performs precoding. In operation 662, a transmission signal generated through precoding is transferred to the receiver.

The aformentioned process may be repeated a predetermined number of times or for a predetermined amount of time. A codebook used by each of the transmitter and the receiver is reset in operation 670.

Accordingly, each of the transmitter and the receiver may repeat the aformentioned process using an initially used basic codebook.

As described above with reference to FIG. 5, the terminal may select, as the new preferred codeword, one of codewords of the new codebook, and may feed back, to the transmitter, information associated with the new preferred codeword. In this example, the terminal may not necessarily fully generate the new codebook because the terminal may select one or more codewords of the reference codebook C as the new preferred codeword.

For example, the terminal may generate the new codebook and then select, as the new preferred codeword, one of codewords of the new codebook. Also, without fully generating the new codebook, the terminal may express the new preferred codeword as one of the codewords of the reference codebook. The terminal may feed back, to the base station, information associated with the new preferred codeword. Information associated with the new preferred codeword may include information associated with an index of the new preferred codeword in the new codebook, or information with an index of a codeword corresponding to the new preferred codeword in the reference codebook C.

The new preferred codeword may be expressed as an index of one of codewords included in the new codebook, or may be expressed as an index of one of codewords included in the reference codebook C. With respect to the example where the terminal generates information associated with the new preferred codeword from the new codebook, and the example where the terminal generates information associated with the preferred codeword from the reference codebook C, the base station may generate the rotation matrix $$Q_{v_{vec(H^H H)}}^{(t-1)}.$$

Accordingly, the base station may verify the corresponding new preferred codeword based on information associated with the new preferred codeword, fed back from the terminal.

Descriptions are made with reference to FIG. 5 and FIG. 6 based on the transmitter and the receiver generating the rotation matrix R or the rotation matrix $$Q_{v_{vec(H^H H)}}^{(t-1)}$$

and then generating the new codebook or the new preferred codeword using the generated rotation matrix R or the rotation matrix $$Q_{v_{vec(H^H H)}}^{(t-1)}.$$

In this example, each of the transmitter and the receiver may generate the new codebook or the new codeword by rotating the pre-stored reference codebook $$\tilde{w}_l(\tilde{w}_i)$$

or the reference codebook C using the rotation matrix.

According to various examples, in addition to a reference codebook, a product between the reference codebook and a matrix defined based on a reference codeword may be pre-stored in the memory of a transmitter and a receiver. In this example, each of the transmitter and the receiver may generate a relatively less complex new codebook or new codeword.

For example, the reference codebook may be expressed by $$\tilde{w}_l(\tilde{w}_i)$$

with respect to a given reference codeword $$\tilde{w}_i,$$

and a previous preferred codeword may be expressed by $$\tilde{w}_p.$$

In this example, the new codebook $$\tilde{w}_l(\tilde{w}_p)$$

may be expressed by an inner product $$\tilde{w}_l(\tilde{w}_p) = R\tilde{w}_l(\tilde{w}_i)$$

between the rotation matrix R $$\tilde{w}_l(\tilde{w}_i)$$

according to Equation 1. The rotation matrix R may be expressed by $$R = [\tilde{w}_p \ \hat{w}_p^\perp][\tilde{w}_i \ \hat{w}_i^\perp]^H$$

according to Equation 2. Accordingly, the new codebook may be represented as $\tilde{w}_l(\tilde{w}_p)=[\tilde{w}_p \ \tilde{w}_p^\perp][\tilde{w}_i \ \tilde{w}_i^\perp]\tilde{w}_l(\tilde{w}_i)$. Because the matrix $[\tilde{w}_i \ \tilde{w}_i^\perp]$, defined based on the reference codeword $\tilde{w}_i$, and the reference codebook $\tilde{w}_l(\tilde{w}_i)$ are fixed, the new codebook $\tilde{w}_l(\tilde{w}_p)$ may be considered as a function of $[\tilde{w}_p \ \tilde{w}_p^\perp]$. Each of the transmitter and the receiver may pre-store, in memory, $[\tilde{w}_i \ \tilde{w}_i^\perp]\tilde{w}_l(\tilde{w}_i)$, which is a product between the matrix $[\tilde{w}_i \ \tilde{w}_i^\perp]$, based on the reference codeword $\tilde{w}_i$ and the reference codebook $\tilde{w}_l(\tilde{w}_i)$. Accordingly, the transmitter and the receiver may adaptively generate the new codebook $\tilde{w}_l(\tilde{w}_p)$ by sharing the varying previous preferred codeword $\tilde{w}_p$.

As another example, each of the transmitter and the receiver may fully generate the new codebook $\tilde{w}_l(\tilde{w}_p)$. In this example, the receiver may feed back, to the transmitter, information associated with an index of the previous preferred codeword $\tilde{w}_p$, thus allowing the transmitter and the receiver to share the previous preferred codeword $\tilde{w}_p$. The product $[\tilde{w}_i \ \tilde{w}_i^\perp]\tilde{w}_l(\tilde{w}_i)$ between the matrix $[\tilde{w}_i \ \tilde{w}_i^\perp]$, based on the reference codeword $\tilde{w}_i$, and the reference codebook $\tilde{w}_l(\tilde{w}_i)$ may be pre-stored in the memory of each of the transmitter and the receiver. Each of the transmitter and the receiver may calculate $[\tilde{w}_p \ \tilde{w}_p^\perp]$ based on the previous preferred codeword $\tilde{w}_p$, and may generate the same new codebook $\tilde{w}_l(\tilde{w}_p)$ based on $[\tilde{w}_p \ \tilde{w}_p^\perp]$ and $[\tilde{w}_i \ \tilde{w}_i^\perp]\tilde{w}_l(\tilde{w}_i)$. Next, the receiver may select the new preferred codeword from the new codebook $\tilde{w}_l(\tilde{w}_p)$, and may feed back, to the transmitter, information associated with the new preferred codeword. The transmitter may verify the new preferred codeword from the new codebook $\tilde{w}_l(\tilde{w}_p)$ based on information fed back from the receiver. Because $[\tilde{w}_i \ \tilde{w}_i^\perp]\tilde{w}_l(\tilde{w}_i)$ is pre-stored in the memory, each of the transmitter and the receiver do not have to calculate an inner product between $[\tilde{w}_i \ \tilde{w}_i^\perp]$ and $\tilde{w}_l(\tilde{w}_i)$ in order to generate the new codebook $\tilde{w}_l(\tilde{w}_p)$. By pre-storing $[\tilde{w}_i \ \tilde{w}_i^\perp]\tilde{w}_l(\tilde{w}_i)$ in the memory, it is possible to reduce a calculation amount used for generating the new codebook $\tilde{w}_l(\tilde{w}_p)$.

As another example, each of the transmitter and the receiver may transmit and receive information associated with the new preferred codeword without fully generating the new codebook $\tilde{w}_l(\tilde{w}_p)$. Similarly, the receiver may feed back, to the transmitter, information associated with the previous preferred codeword $\tilde{w}_p$, thus allowing the transmitter and the receiver to share the previous preferred codeword $\tilde{w}_p$. The product $[\tilde{w}_i \ \tilde{w}_i^\perp]\tilde{w}_l(\tilde{w}_i)$ between the matrix $[\tilde{w}_i \ \tilde{w}_i^\perp]$, based on the reference codeword $\tilde{w}_i$ and the reference codebook $\tilde{w}_l(\tilde{w}_i)$ may be pre-stored in the memory of each of the transmitter and the receiver. $[\tilde{w}_i \ \tilde{w}_i^\perp]\tilde{w}_l(\tilde{w}_i)$ may include a plurality of codewords. The receiver may select, as a codeword corresponding to the new preferred codeword, one of the codewords included in $[\tilde{w}_i \ \tilde{w}_i^\perp]\tilde{w}_l(\tilde{w}_i)$. The substantially new preferred codeword may be determined as the inner product between $[\tilde{w}_p \ \tilde{w}_p^\perp]$ and a codeword selected from a plurality of codewords included in $$[\tilde{w}_i \ \hat{w}_i^\perp]\tilde{w}_l(\tilde{w}_i).$$

The receiver may feed back, to the transmitter as information associated with the new preferred codeword, information associated with the codeword selected from the plurality of codewords included in $$[\tilde{w}_i \ \hat{w}_i^\perp]\tilde{w}_l(\tilde{w}_i),$$

for example, information associated with an index of the selected codeword. The transmitter may extract the codeword selected from the plurality of codewords included in $$[\tilde{w}_i \ \hat{w}_i^\perp]\tilde{w}_l(\tilde{w}_i),$$

based on information fed back from the receiver. The transmitter may verify, as the new preferred codeword, the inner product between $$[\tilde{w}_p \ \hat{w}_p^\perp]$$

and the selected codeword.

The above described examples may be applicable when explicit feedback is used. For example, when the transmitter and the receiver use the explicit feedback, the transmitter and the receiver may generate the new codebook corresponding to the previous preferred codeword $$v_{vec(H^H H)}(t-1)$$

or the transmitter and the receiver may generate the new preferred codeword by pre-storing, in the memory, the inner product between $$[\tilde{w}_b \; \hat{w}_b^\perp],$$

based on the reference codeword $w_b$, and the reference codebook C, without a need to calculate the rotation matrix $$Q_{v_{vec(H^H H)}}^{(t-1)}$$

in real time.

Figure 7:
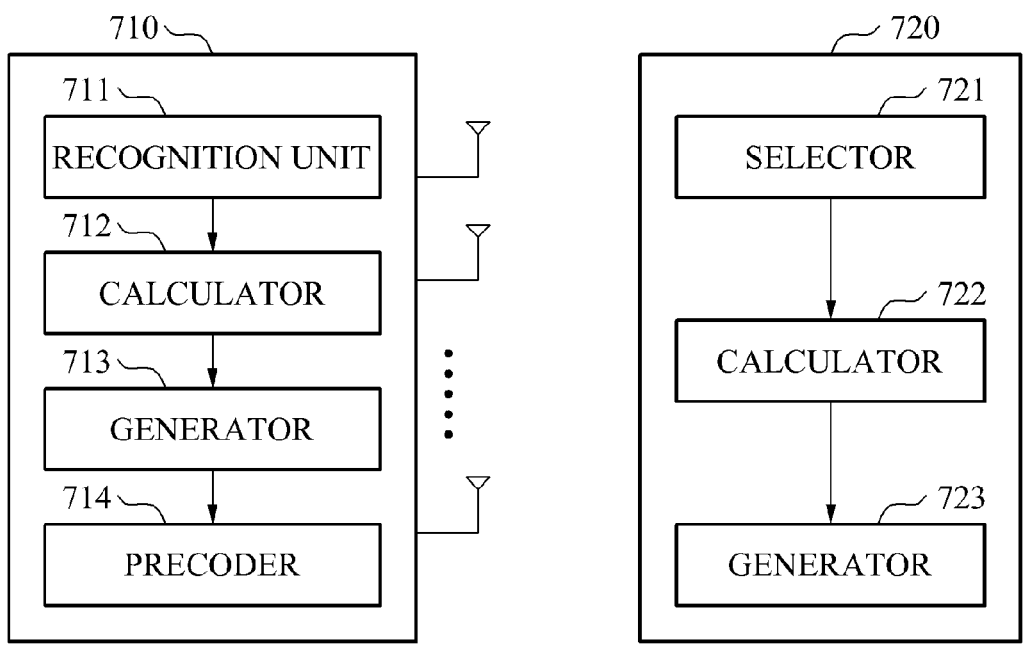
FIG. 7 is a diagram illustrating an example of a base station and a terminal.

FIG. 7 illustrates an example of a base station and a terminal.

Referring to FIG. 7, base station 710 includes a recognition unit 711, a calculator 712, a generator 713, and a precoder 714. Terminal 720 includes a selector 721, a calculator 722, and a generator 723.

The selector 721 of the terminal 720 may select a previous preferred codeword using a basic codebook, and may feed back, to the base station 710, information associated with the selected previous preferred codeword. The calculator 722 may calculate a rotation matrix based on the previous preferred codeword and a random codeword from among codewords included in a DFT codebook. The generator 723 may generate a new codebook using the rotation matrix.

The recognition unit 711 of the base station 710 may recognize the previous preferred codeword based on information associated with the previous preferred codeword fed back from the terminal 720. The calculator 712 may calculate a rotation matrix based on the previous preferred codeword and the random codeword included in the DFT codebook. The generator 713 may generate the new codebook using the rotation matrix.

When the selector 721 of the terminal 720 selects a new preferred codeword and feeds back information associated with the new preferred codeword, the base station 710 may recognize the new preferred codeword using the new codebook, and generate a new precoding matrix based on the new preferred codeword. The precoder 714 may precode at least one data stream using the new precoding matrix.

Figure 8:
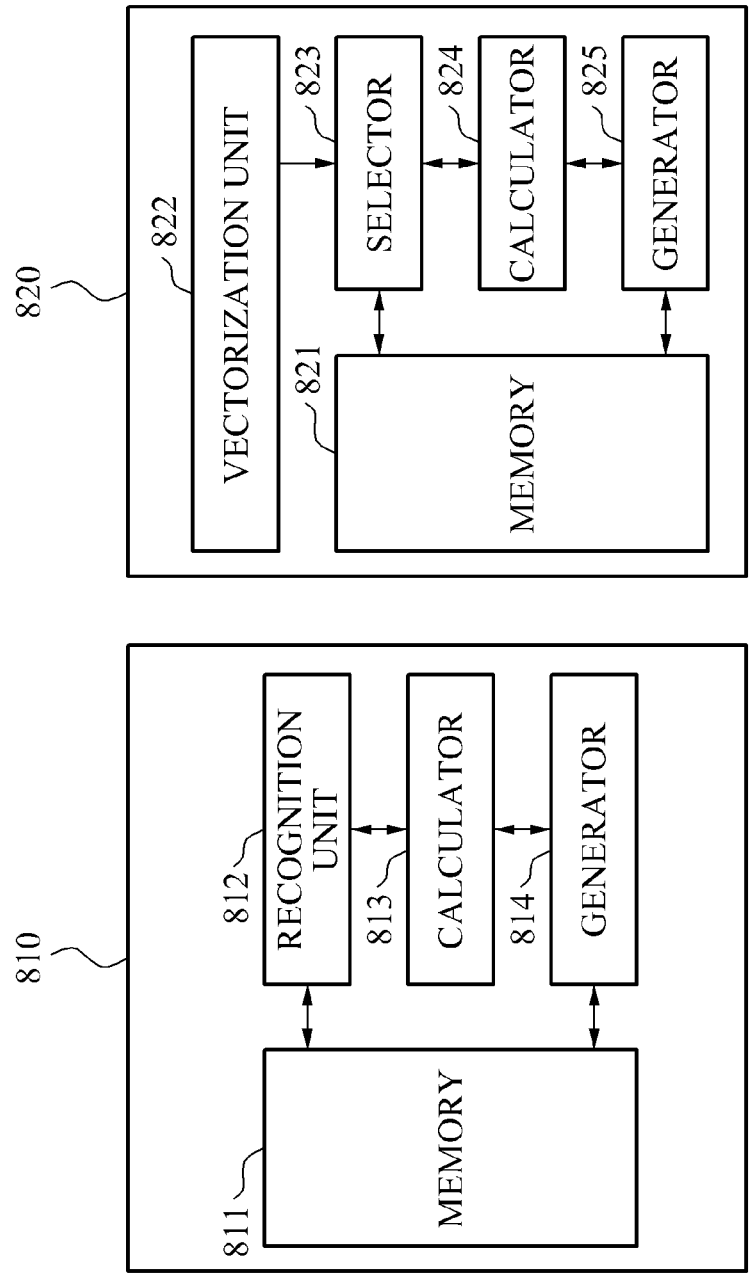
FIG. 8 is a diagram illustrating an example of a transmitter and a receiver.

FIG. 8 illustrates an example of a transmitter and receiver 820.

Referring to FIG. 8, transmitter 810 includes a memory 811, a recognition unit 812, a calculator 813, and a generator 814. The receiver 820 includes a memory 821, a vectorization unit 822, a selector 823, a calculator 824, and a generator 825.

A basic codebook and a reference codebook may be stored in the memory 811. A new generated codebook may also be stored in the memory 811.

The recognition unit 812 may recognize a previous preferred codeword selected by the receiver 820, based on a previous explicit channel matrix between the transmitter 810 and the receiver 820.

The calculator 813 may calculate a rotation matrix based on the previous preferred codeword.

To generate the new codebook, the generator 814 may rotate the reference codebook using the rotation matrix.

When the new codebook is generated, the recognition unit 812 may recognize a new preferred codeword. A precoder (not shown) of the transmitter 810 may perform precoding using a precoding matrix that is generated based on the new preferred codeword.

The basic codebook and the reference codebook may be stored in the memory 821 of the receiver 820. The newly generated codebook may also be stored in the memory 821.

To obtain vectorized channel information, the vectorization unit 822 may vectorize information associated with a previous explicit channel matrix between the transmitter 810 and the receiver 820.

The selector 823 may select the previous preferred codeword based on the vectorized channel information.

The calculator 824 may calculate the rotation matrix based on the previous preferred codeword.

To generate the new codebook, the generator 825 may rotate the reference codebook using the rotation matrix.

When the new codebook is generated, the receiver 820 may calculate a subsequent explicit channel matrix and may select, from the new codebook, a new preferred codeword corresponding to the subsequent explicit channel matrix. Information associated with the new preferred codeword may be fed back to the transmitter 810.

Description made above with reference to FIG. 1 through FIG. 6 may be applicable to the devices of FIG. 7 and FIG. 8. For example, the base station 710 and the terminal 720 of FIG. 7, and the transmitter 810 and the receiver 820 of FIG. 8 may generate the new codebook using the rotation matrix, and may also generate the new codebook using a product between a matrix, defined based on a reference codeword, and the reference codebook.

Further descriptions related to the constituent elements of FIG. 7 and FIG. 8 are omitted here for conciseness.

Table 1 and Table 2 below illustrate examples of numerical values of a new codebook according to $\tilde{w}_i$ and a number of transmit antennas in a system using an implicit feedback. Also, codebook (:,:,n) denotes an $n^{th}$ codeword in the new codebook. A unitary matrix $[\tilde{w}_i \; \tilde{w}_i^\perp]$ defined based on $\tilde{w}_i$ may be multiplied in advance to codebooks disclosed in Table 1 and Table 2. The product thereof may be pre-stored in a memory of each of a transmitter and a receiver.

(1) In this example, $\tilde{w}_i$ is $$\frac{1}{\sqrt{4}}[1 \; 1 \; 1 \; 1]^T,$$

and four transmit antennas are installed in the base station.

TABLE 1

| An example where a reference codebook includes three codewords of a DFT codebook and 13 codewords of a polar cap codebook: | An example where a reference codebook includes five codewords of a DFT codebook and 11 codewords of a polar cap codebook: |
|---|---|
| codebook(:, :, 1) = | codebook(:, :, 1) = |
| 0.5000 | 0.5000 |
| 0.4619 − 0.1913i | 0.4619 − 0.1913i |
| 0.3536 − 0.3536i | 0.3536 − 0.3536i |
| 0.1913 − 0.4619i | 0.1913 − 0.4619i |
| codebook(:, :, 2) = | codebook(:, :, 2) = |
| 0.5000 | 0.5000 |
| 0.5000 | 0.4904 − 0.0975i |
| 0.5000 | 0.4619 − 0.1913i |
| 0.5000 | 0.4157 − 0.2778i |
| codebook(:, :, 3) = | codebook(:, :, 3) = |
| 0.5000 | 0.5000 |
| 0.4619 + 0.1913i | 0.5000 |
| 0.3536 + 0.3536i | 0.5000 |
| 0.1913 + 0.4619i | 0.5000 |

TABLE 1-continued

| An example where a reference codebook includes three codewords of a DFT codebook and 13 codewords of a polar cap codebook: | An example where a reference codebook includes five codewords of a DFT codebook and 11 codewords of a polar cap codebook: |
|---|---|
| codebook(:, :, 4) = | codebook(:, :, 4) = |
| 0.4018 − 0.1885i | 0.5000 |
| 0.6033 + 0.0472i | 0.4904 + 0.0975i |
| 0.3626 + 0.2002i | 0.4619 + 0.1913i |
| 0.5117 − 0.0588i | 0.4157 + 0.2778i |
| codebook(:, :, 5) = | codebook(:, :, 5) = |
| 0.4687 − 0.1197i | 0.5000 |
| 0.5114 − 0.0280i | 0.4619 + 0.1913i |
| 0.5656 − 0.1015i | 0.3536 + 0.3536i |
| 0.3337 + 0.2492i | 0.1913 + 0.4619i |
| codebook(:, :, 6) = | codebook(:, :, 6) = |
| 0.5132 − 0.0781i | 0.5182 + 0.2035i |
| 0.4948 + 0.1131i | 0.4946 + 0.0989i |
| 0.6244 + 0.0860i | 0.3682 − 0.2059i |
| 0.2471 − 0.1211i | 0.4984 − 0.0965i |
| codebook(:, :, 7) = | codebook(:, :, 7) = |
| 0.5607 + 0.0421i | 0.4456 − 0.0396i |
| 0.3387 + 0.0700i | 0.6368 − 0.0764i |
| 0.3081 + 0.0200i | 0.2196 + 0.0481i |
| 0.6719 − 0.1321i | 0.5773 + 0.0679i |
| codebook(:, :, 8) = | codebook(:, :, 8) = |
| 0.6936 − 0.0398i | 0.5794 − 0.1936i |
| 0.5285 + 0.1146i | 0.4956 + 0.2377i |
| 0.3048 − 0.0870i | 0.3949 − 0.0149i |
| 0.3524 + 0.0121i | 0.4096 − 0.0293i |
| codebook(:, :, 9) = | codebook(:, :, 9) = |
| 0.4336 + 0.1953i | 0.6751 + 0.0001i |
| 0.5633 + 0.0399i | 0.2514 − 0.0694i |
| 0.5476 − 0.2049i | 0.3800 + 0.0105i |
| 0.3349 − 0.0302i | 0.5729 + 0.0588i |
| codebook(:, :, 10) = | codebook(:, :, 10) = |
| 0.3759 + 0.0879i | 0.6323 + 0.0705i |
| 0.6483 − 0.0644i | 0.5466 − 0.0828i |
| 0.2663 − 0.0770i | 0.4230 + 0.1359i |
| 0.5889 + 0.0535i | 0.2776 − 0.1235i |
| codebook(:, :, 11) = | codebook(:, :, 11) = |
| 0.3737 − 0.1219i | 0.3491 + 0.1889i |
| 0.4570 + 0.2606i | 0.4217 − 0.1870i |
| 0.5131 − 0.1364i | 0.5240 + 0.0806i |
| 0.5355 − 0.0023i | 0.5846 − 0.0825i |
| codebook(:, :, 12) = | codebook(:, :, 12) = |
| 0.3004 + 0.1162i | 0.4088 − 0.2058i |
| 0.4171 − 0.0147i | 0.4407 − 0.0781i |
| 0.6176 + 0.0892i | 0.5694 + 0.2246i |
| 0.5442 − 0.1908i | 0.4605 + 0.0593i |
| codebook(:, :, 13) = | codebook(:, :, 13) = |
| 0.4130 + 0.0778i | 0.2649 + 0.0123i |
| 0.6208 − 0.2176i | 0.6814 + 0.0732i |
| 0.5169 + 0.1228i | 0.5641 − 0.0113i |
| 0.3287 + 0.0170i | 0.3690 − 0.0742i |
| codebook(:, :, 14) = | codebook(:, :, 14) = |
| 0.6622 − 0.0806i | 0.5078 + 0.0366i |
| 0.3315 − 0.1259i | 0.2973 + 0.0731i |
| 0.4559 + 0.1909i | 0.7158 − 0.0466i |
| 0.4298 + 0.0157i | 0.3584 − 0.0631i |
| codebook(:, :, 15) = | codebook(:, :, 15) = |
| 0.3416 − 0.0854i | 0.3211 − 0.0820i |
| 0.3779 − 0.1321i | 0.3909 + 0.0864i |
| 0.4893 + 0.0703i | 0.5110 − 0.1399i |
| 0.6706 + 0.1473i | 0.6564 − 0.1355i |
| codebook(:, :, 16) = | codebook(:, :, 16) = |
| 0.5390 + 0.0730i | 0.4993 + 0.0648i |
| 0.2130 + 0.0017i | 0.5261 − 0.1446i |
| 0.6269 − 0.1164i | 0.5116 − 0.1426i |
| 0.5006 + 0.0416i | 0.3424 + 0.2225i |

(2) In this example, $\tilde{w}_i$ is $$\frac{1}{\sqrt{8}}[1\ 1\ 1\ 1\ 1\ 1\ 1\ 1]^T,$$

and eight transmit antennas are installed in the base station.

TABLE 2

| An example where a reference codebook includes three codewords of a DFT codebook and 13 codewords of a polar cap codebook: | An example where a reference codebook includes five codewords of a DFT codebook and 11 codewords of a polar cap codebook:, |
|---|---|
| codebook(:, :, 1) = | codebook(:, :, 1) = |
| 0.3536 | 0.3536 |
| 0.3481 − 0.0620i | 0.3466 − 0.0697i |
| 0.3318 − 0.1221i | 0.3260 − 0.1367i |
| 0.3053 − 0.1783i | 0.2927 − 0.1984i |
| 0.2693 − 0.2291i | 0.2478 − 0.2522i |
| 0.2249 − 0.2728i | 0.1932 − 0.2961i |
| 0.1736 − 0.3080i | 0.1310 − 0.3284i |
| 0.1169 − 0.3337i | 0.0636 − 0.3478i |
| codebook(:, :, 2) = | codebook(:, :, 2) = |
| 0.3536 | 0.3536 |
| 0.3536 | 0.3489 − 0.0574i |
| 0.3536 | 0.3349 − 0.1133i |
| 0.3536 | 0.3121 − 0.1661i |
| 0.3536 | 0.2810 − 0.2146i |
| 0.3536 | 0.2424 − 0.2573i |
| 0.3536 | 0.1974 − 0.2933i |
| 0.3536 | 0.1472 − 0.3214i |
| codebook(:, :, 3) = | codebook(:, :, 3) = |
| 0.3536 | 0.3536 |
| 0.3481 + 0.0620i | 0.3536 |
| 0.3318 + 0.1221i | 0.3536 |
| 0.3053 + 0.1783i | 0.3536 |
| 0.2693 + 0.2291i | 0.3536 |
| 0.2249 + 0.2728i | 0.3536 |
| 0.1736 + 0.3080i | 0.3536 |
| 0.1169 + 0.3337i | 0.3536 |
| codebook(:, :, 4) = | codebook(:, :, 4) = |
| 0.2906 − 0.0200i | 0.3536 |
| 0.4444 + 0.0108i | 0.3489 + 0.0574i |
| 0.4342 + 0.0303i | 0.3349 + 0.1133i |
| 0.1793 − 0.0863i | 0.3121 + 0.1661i |
| 0.2521 − 0.1518i | 0.2810 + 0.2146i |
| 0.3282 + 0.0218i | 0.2424 + 0.2573i |
| 0.3004 + 0.1157i | 0.1974 + 0.2933i |
| 0.4287 + 0.0795i | 0.1472 + 0.3214i |
| codebook(:, :, 5) = | codebook(:, :, 5) = |
| 0.3311 − 0.1474i | 0.3536 |
| 0.3272 + 0.1143i | 0.3466 + 0.0697i |
| 0.3873 + 0.0384i | 0.3260 + 0.1367i |
| 0.3626 − 0.0583i | 0.2927 + 0.1984i |
| 0.3737 + 0.0192i | 0.2478 + 0.2522i |
| 0.1792 + 0.0889i | 0.1932 + 0.2961i |
| 0.4404 + 0.0747i | 0.1310 + 0.3284i |
| 0.2563 − 0.1298i | 0.0636 + 0.3478i |
| codebook(:, :, 6) = | codebook(:, :, 6) = |
| 0.2673 − 0.0837i | 0.4087 − 0.1423i |
| 0.2992 + 0.1142i | 0.3424 + 0.0171i |
| 0.4013 − 0.1815i | 0.4275 + 0.0098i |
| 0.3279 + 0.0871i | 0.2875 + 0.0866i |
| 0.4244 − 0.0023i | 0.2881 + 0.0528i |
| 0.3868 + 0.0546i | 0.1225 + 0.0462i |
| 0.1992 − 0.0770i | 0.4079 − 0.1094i |
| 0.3517 + 0.0886i | 0.3733 + 0.0392i |
| codebook(:, :, 7) = | codebook(:, :, 7) = |
| 0.3565 + 0.0150i | 0.3188 + 0.0333i |
| 0.3273 + 0.2208i | 0.2778 + 0.0529i |
| 0.2443 + 0.0437i | 0.2487 + 0.0578i |
| 0.3531 − 0.0023i | 0.2626 − 0.1090i |
| 0.1877 − 0.0503i | 0.2024 − 0.1105i |

TABLE 2-continued

| An example where a reference codebook includes three codewords of a DFT codebook and 13 codewords of a polar cap codebook: | An example where a reference codebook includes five codewords of a DFT codebook and 11 codewords of a polar cap codebook:, |
|---|---|
| 0.3968 − 0.0686i | 0.4407 + 0.0651i |
| 0.3967 − 0.1257i | 0.5149 − 0.0148i |
| 0.3954 − 0.0325i | 0.3919 + 0.0252i |
| codebook(:, :, 8) = | codebook(:, :, 8) = |
| 0.2692 + 0.0564i | 0.3249 + 0.1225i |
| 0.1377 − 0.0422i | 0.1663 − 0.1050i |
| 0.3737 + 0.0732i | 0.4730 − 0.0628i |
| 0.4682 + 0.0232i | 0.4463 − 0.0522i |
| 0.3543 − 0.1060i | 0.3211 − 0.0360i |
| 0.3830 − 0.1081i | 0.2917 + 0.0030i |
| 0.3267 + 0.1309i | 0.2622 + 0.0116i |
| 0.3452 − 0.0274i | 0.3723 + 0.1189i |
| codebook(:, :, 9) = | codebook(:, :, 9) = |
| 0.5558 − 0.0265i | 0.3023 + 0.1017i |
| 0.2917 − 0.1080i | 0.4171 − 0.1082i |
| 0.2468 − 0.0112i | 0.3013 − 0.0774i |
| 0.2349 + 0.0975i | 0.2540 − 0.0943i |
| 0.3841 − 0.0851i | 0.4626 + 0.0800i |
| 0.3777 + 0.0857i | 0.2419 − 0.0756i |
| 0.2959 + 0.0462i | 0.4456 + 0.0591i |
| 0.2710 + 0.0014i | 0.2329 − 0.0365i |
| codebook(:, :, 10) = | codebook(:, :, 10) = |
| 0.3512 − 0.0135i | 0.4777 + 0.0271i |
| 0.3684 − 0.0787i | 0.3758 + 0.0304i |
| 0.3290 − 0.1587i | 0.3884 − 0.0726i |
| 0.4496 + 0.0104i | 0.1430 + 0.0150i |
| 0.1138 + 0.0889i | 0.2631 + 0.0491i |
| 0.3743 + 0.0376i | 0.4234 − 0.1415i |
| 0.3744 + 0.0846i | 0.2543 + 0.0771i |
| 0.2972 + 0.0294i | 0.3321 + 0.0155i |
| codebook(:, :, 11) = | codebook(:, :, 11) = |
| 0.3019 − 0.0112i | 0.3258 + 0.0077i |
| 0.3290 − 0.0413i | 0.4535 + 0.1335i |
| 0.2526 + 0.0865i | 0.2207 − 0.1357i |
| 0.3723 − 0.1501i | 0.4762 − 0.0651i |
| 0.3556 + 0.0874i | 0.2862 + 0.0479i |
| 0.4419 + 0.1317i | 0.3398 + 0.0154i |
| 0.1810 − 0.0185i | 0.2637 − 0.0952i |
| 0.4235 − 0.0845i | 0.2919 + 0.0916i |
| codebook(:, :, 12) = | codebook(:, :, 12) = |
| 0.4414 + 0.1170i | 0.3206 − 0.1515i |
| 0.2544 − 0.0440i | 0.2309 + 0.0076i |
| 0.5248 − 0.0495i | 0.3581 − 0.0484i |
| 0.2776 − 0.0560i | 0.2996 − 0.0536i |
| 0.2809 + 0.0889i | 0.4396 − 0.0205i |
| 0.2543 − 0.0280i | 0.4923 + 0.1656i |
| 0.3243 − 0.1383i | 0.2596 + 0.0153i |
| 0.3002 + 0.0109i | 0.2573 − 0.0217i |
| codebook(:, :, 13) = | codebook(:, :, 13) = |
| 0.3326 + 0.0290i | 0.3051 − 0.0012i |
| 0.3162 − 0.0246i | 0.2855 + 0.0357i |
| 0.2439 − 0.0715i | 0.3594 + 0.0434i |
| 0.2435 + 0.0394i | 0.4562 + 0.0575i |
| 0.4144 + 0.1580i | 0.2306 + 0.1272i |
| 0.2499 − 0.1466i | 0.3672 − 0.0690i |
| 0.3653 + 0.0636i | 0.3967 + 0.0267i |
| 0.4921 − 0.0474i | 0.2572 − 0.2202i |
| codebook(:, :, 14) = | codebook(:, :, 14) = |
| 0.2175 + 0.0841i | 0.3081 − 0.0503i |
| 0.3069 − 0.0547i | 0.3402 − 0.0946i |
| 0.2585 − 0.0121i | 0.2667 + 0.2106i |
| 0.3180 − 0.0758i | 0.3316 − 0.0211i |
| 0.4315 − 0.0575i | 0.4165 + 0.0586i |
| 0.3420 + 0.0932i | 0.3835 − 0.1392i |
| 0.5086 − 0.1004i | 0.3140 − 0.0845i |
| 0.2749 + 0.1231i | 0.2972 + 0.1204i |
| codebook(:, :, 15) = | codebook(:, :, 15) = |
| 0.2964 + 0.1588i | 0.2917 + 0.1081i |
| 0.5326 + 0.0223i | 0.4485 − 0.0486i |
| 0.3281 − 0.0056i | 0.3132 − 0.0894i |
| 0.3657 + 0.0395i | 0.3024 − 0.0441i |
| 0.3868 − 0.0507i | 0.3313 − 0.0770i |
| 0.3071 − 0.0468i | 0.3187 + 0.0794i |
| 0.2536 − 0.0103i | 0.1801 − 0.0633i |
| 0.1876 − 0.1073i | 0.4720 − 0.1320i |
| codebook(:, :, 16) = | codebook(:, :, 16) = |
| 0.3207 − 0.1592i | 0.3444 − 0.0422i |
| 0.4222 − 0.0774i | 0.3012 + 0.0864i |
| 0.3093 + 0.1507i | 0.2281 − 0.0137i |
| 0.4130 + 0.0336i | 0.3942 + 0.0675i |
| 0.3435 + 0.0559i | 0.4403 − 0.1554i |
| 0.2832 − 0.1124i | 0.2275 − 0.1057i |
| 0.2810 − 0.0390i | 0.3523 + 0.1654i |
| 0.2851 + 0.1478i | 0.3700 − 0.0024i |

Table 3 below illustrates examples of numerical values of a new codebook according to a number of feedback bits, for example, a size of the new codebook. Also, codebook (:,:,n) denotes an $n^{th}$ codeword in the new codebook, and codebook (:,:,n) also indicates a result where a unitary matrix $[w_b\ w_b^\perp]$ generated by $w_b$ is multiplied in advance.

TABLE 3

| 4 bits | 6 bits |
|---|---|
| codebook(:, :, 1) = | codebook(:, :, 1) = |
| −0.9248 | −0.9235 − 0.0000i |
| −0.1939 − 0.0898i | −0.1099 − 0.0503i |
| −0.0514 − 0.0371i | 0.0387 + 0.0387i |
| −0.0312 + 0.0349i | −0.2053 − 0.0732i |
| −0.1155 − 0.0762i | 0.0558 + 0.0807i |
| −0.0404 − 0.0724i | −0.0723 + 0.0277i |
| −0.0310 − 0.0588i | 0.0353 + 0.0464i |
| −0.0006 + 0.1318i | 0.0504 + 0.0121i |
| −0.0090 + 0.0654i | −0.0250 − 0.0474i |
| 0.0621 + 0.0212i | −0.0003 − 0.0385i |
| 0.0483 + 0.0347i | 0.0640 − 0.0294i |
| −0.1079 − 0.0077i | −0.1012 − 0.0833i |
| −0.0890 + 0.0549i | 0.0100 + 0.0719i |
| −0.0122 + 0.0395i | −0.0948 + 0.0678i |
| −0.0033 − 0.0353i | 0.0391 + 0.0475i |
| −0.0835 + 0.0195i | 0.0430 − 0.0964i |
| codebook(:, :, 2) = | codebook(:, :, 2) = |
| −0.9551 + 0.0000i | −0.9020 − 0.0000i |
| 0.0064 − 0.0429i | −0.0748 − 0.1176i |
| 0.0953 + 0.0400i | −0.0747 − 0.0740i |
| −0.0871 − 0.0228i | 0.0035 + 0.0369i |
| −0.0324 + 0.0215i | −0.1370 − 0.0091i |
| 0.0076 + 0.0261i | 0.0307 − 0.0657i |
| 0.0100 + 0.0138i | −0.0898 − 0.1464i |
| 0.0720 + 0.0218i | −0.0132 + 0.1441i |
| 0.0560 − 0.1152i | −0.0111 + 0.2122i |
| 0.0172 + 0.0461i | 0.0696 + 0.0657i |
| −0.0094 + 0.0325i | 0.0022 + 0.0215i |
| −0.0708 − 0.0204i | −0.0570 + 0.0452i |
| 0.0645 + 0.0761i | −0.0110 + 0.1031i |
| −0.0635 + 0.0691i | 0.0494 + 0.0220i |
| −0.0466 + 0.0667i | 0.0430 − 0.0186i |
| −0.0233 − 0.0875i | −0.0620 + 0.0156i |
| codebook(:, :, 3) = | codebook(:, :, 3) = |
| −0.9305 − 0.0000i | −0.8795 + 0.0000i |
| 0.1122 − 0.0896i | −0.1335 − 0.0662i |
| 0.0058 − 0.0430i | −0.1131 − 0.0594i |
| −0.0635 − 0.0212i | −0.2664 − 0.0680i |
| −0.0797 + 0.0738i | −0.1604 + 0.0144i |
| 0.0121 + 0.0048i | −0.0973 − 0.0400i |
| −0.0603 − 0.0627i | −0.1067 − 0.0488i |
| −0.0182 + 0.0744i | −0.0785 + 0.1053i |
| 0.0378 + 0.1520i | −0.0611 + 0.0870i |
| 0.0694 + 0.0440i | 0.0432 + 0.0184i |
| 0.0019 − 0.0240i | 0.0060 − 0.0576i |

TABLE 3-continued

| 4 bits | 6 bits |
|---|---|
| −0.0746 + 0.0549i | −0.1187 + 0.0120i |
| 0.1238 + 0.0747i | −0.0201 − 0.0232i |
| −0.0800 + 0.1079i | −0.0360 + 0.0408i |
| 0.0235 + 0.0362i | −0.0225 − 0.0671i |
| −0.0188 − 0.0148i | −0.0656 + 0.0045i |
| codebook(:, :, 4) = | codebook(:, :, 4) = |
| −0.9356 − 0.0000i | −0.9387 + 0.0000i |
| −0.0371 + 0.0431i | −0.0045 − 0.0014i |
| −0.1056 + 0.0140i | −0.1235 − 0.0567i |
| 0.0467 − 0.0303i | −0.0089 − 0.0039i |
| 0.0747 − 0.0909i | −0.1095 + 0.0361i |
| 0.0106 − 0.0378i | 0.0785 + 0.0835i |
| 0.0023 − 0.0637i | −0.0161 − 0.0613i |
| 0.0457 − 0.0124i | 0.0296 − 0.0043i |
| −0.0963 + 0.1173i | −0.0362 + 0.1677i |
| −0.0005 − 0.0863i | 0.0628 − 0.0274i |
| 0.0024 + 0.1033i | 0.0145 + 0.0352i |
| 0.0350 + 0.0638i | 0.0598 − 0.0704i |
| −0.0938 − 0.0965i | −0.0305 − 0.0004i |
| 0.0328 − 0.0362i | 0.0830 − 0.0087i |
| −0.0233 − 0.0913i | 0.0780 − 0.0780i |
| 0.0020 + 0.0969i | −0.0253 − 0.0648i |
| codebook(:, :, 5) = | codebook(:, :, 5) = |
| −0.9425 − 0.0000i | −0.9271 − 0.0000i |
| −0.1154 + 0.0301i | 0.1474 − 0.0671i |
| 0.0286 − 0.0049i | 0.0438 + 0.1092i |
| 0.0230 + 0.0002i | −0.0783 − 0.0643i |
| 0.0250 − 0.1479i | 0.0794 + 0.0701i |
| 0.0060 − 0.0410i | −0.0116 + 0.0344i |
| 0.0116 + 0.0162i | −0.0123 − 0.0055i |
| 0.0101 + 0.0322i | 0.0887 − 0.0546i |
| 0.0428 − 0.1128i | −0.0614 − 0.0017i |
| −0.0371 − 0.0486i | 0.0163 + 0.0131i |
| −0.0410 + 0.1445i | −0.0157 − 0.0004i |
| −0.0535 + 0.0380i | −0.0189 + 0.0441i |
| −0.0879 + 0.0073i | 0.1683 + 0.0499i |
| −0.0182 − 0.0162i | −0.0741 − 0.0926i |
| −0.0528 + 0.0282i | −0.0835 + 0.0113i |
| −0.0575 + 0.1001i | 0.0604 − 0.0646i |
| codebook(:, :, 6) = | codebook(:, :, 6) = |
| −0.9316 − 0.0000i | −0.9353 + 0.0000i |
| 0.0668 + 0.0186i | −0.1427 − 0.0816i |
| 0.0882 − 0.0645i | −0.0418 − 0.0404i |
| −0.1531 − 0.1028i | −0.0910 + 0.0180i |
| 0.1533 + 0.1260i | −0.1575 + 0.0123i |
| −0.0329 + 0.0220i | −0.0175 + 0.0124i |
| −0.0149 − 0.0419i | 0.0009 + 0.0078i |
| −0.0428 + 0.0518i | 0.0059 + 0.0801i |
| 0.0249 + 0.0691i | 0.0191 + 0.0419i |
| 0.0114 + 0.0120i | 0.0710 + 0.0252i |
| 0.0633 − 0.0106i | 0.0539 − 0.0252i |
| −0.0465 + 0.0556i | −0.0830 − 0.0941i |
| 0.0596 + 0.0137i | −0.0433 + 0.0836i |
| −0.0745 + 0.0452i | −0.0045 + 0.0481i |
| −0.0093 + 0.0308i | 0.0640 − 0.0072i |
| 0.0743 + 0.0318i | −0.0678 − 0.0849i |
| codebook(:, :, 7) = | codebook(:, :, 7) = |
| −0.9447 − 0.0000i | −0.9458 − 0.0000i |
| 0.0828 − 0.0350i | −0.0568 + 0.0110i |
| 0.0146 + 0.0825i | −0.0071 − 0.1340i |
| −0.0086 − 0.0572i | 0.0689 + 0.0183i |
| 0.1469 − 0.0417i | 0.0265 + 0.0192i |
| 0.0076 + 0.0230i | 0.0545 + 0.0730i |
| −0.0280 − 0.0008i | 0.0405 − 0.0582i |
| 0.0455 − 0.0611i | −0.0139 + 0.0577i |
| −0.0681 − 0.0221i | 0.0901 + 0.1176i |
| −0.0509 − 0.0039i | 0.0505 + 0.0173i |
| −0.0656 + 0.0744i | 0.0912 + 0.0903i |
| 0.0149 + 0.0840i | −0.0120 − 0.0388i |
| 0.1008 + 0.0520i | −0.0808 + 0.0518i |
| 0.0093 − 0.0018i | 0.0385 − 0.0118i |
| −0.0941 + 0.0041i | 0.0765 + 0.0097i |
| 0.0407 + 0.1012i | −0.0139 + 0.0352i |
| codebook(:, :, 8) = | codebook(:, :, 8) = |
| −0.9378 − 0.0000i | −0.8995 − 0.0000i |
| −0.1491 − 0.0143i | 0.0911 + 0.0821i |
| −0.1318 + 0.0674i | 0.0579 − 0.0025i |
| −0.0880 − 0.0211i | −0.2205 − 0.1560i |
| −0.0760 − 0.0766i | 0.1364 + 0.0860i |
| −0.0114 − 0.0344i | −0.0331 − 0.1070i |
| −0.0407 − 0.0132i | −0.0292 − 0.0469i |
| 0.0475 − 0.0577i | −0.0098 + 0.0534i |
| −0.1121 − 0.0748i | −0.0605 + 0.0859i |
| −0.0588 − 0.0346i | 0.0049 − 0.0417i |
| −0.0964 + 0.0389i | −0.0040 − 0.0186i |
| 0.0212 − 0.0223i | −0.0126 + 0.1502i |
| −0.0355 − 0.0301i | 0.0166 − 0.0946i |
| −0.0001 − 0.0053i | −0.0518 + 0.0134i |
| −0.0794 − 0.0478i | −0.0420 − 0.0194i |
| −0.0394 − 0.0256i | 0.0690 + 0.0068i |
| codebook(:, :, 9) = | codebook(:, :, 9) = |
| −0.9480 − 0.0000i | −0.8961 − 0.0000i |
| −0.0999 + 0.0359i | −0.2279 − 0.0200i |
| −0.0118 − 0.0955i | −0.1278 + 0.0001i |
| −0.1305 − 0.0252i | −0.0958 − 0.0031i |
| −0.1072 + 0.0635i | −0.0987 − 0.0957i |
| 0.0163 + 0.0485i | −0.0654 − 0.0383i |
| −0.0096 − 0.0531i | −0.0532 − 0.0590i |
| −0.0044 + 0.0751i | −0.0003 + 0.0109i |
| 0.0432 + 0.0286i | −0.0615 − 0.0764i |
| 0.0469 + 0.0134i | −0.0575 − 0.0540i |
| 0.0617 − 0.0093i | −0.0271 + 0.0256i |
| −0.0147 − 0.0970i | −0.0363 − 0.0514i |
| −0.0681 − 0.0418i | −0.1022 − 0.1384i |
| −0.0345 + 0.0359i | −0.1282 + 0.0455i |
| 0.0352 − 0.0292i | −0.0828 − 0.0557i |
| −0.0489 − 0.0668i | −0.0763 + 0.0554i |
| codebook(:, :, 10) = | codebook(:, :, 10) = |
| −0.9565 − 0.0000i | −0.9168 − 0.0000i |
| 0.0339 + 0.0222i | −0.1296 − 0.1196i |
| 0.0400 − 0.1210i | −0.1409 + 0.0747i |
| 0.0599 − 0.0010i | −0.0936 − 0.0129i |
| 0.0476 + 0.0177i | −0.1219 − 0.0879i |
| 0.0646 + 0.0713i | −0.0059 − 0.0497i |
| 0.0104 − 0.0667i | −0.0630 + 0.0192i |
| −0.0220 + 0.0508i | 0.0319 − 0.0032i |
| 0.1152 + 0.0787i | −0.1386 + 0.0422i |
| 0.0241 + 0.0319i | 0.0051 − 0.0384i |
| 0.0410 + 0.1009i | −0.0952 + 0.0352i |
| −0.0156 − 0.0185i | −0.0294 + 0.0015i |
| −0.0144 − 0.0410i | 0.0033 + 0.1225i |
| 0.0058 − 0.0004i | 0.0923 − 0.0118i |
| 0.0346 + 0.0451i | −0.0056 − 0.0541i |
| −0.0110 + 0.0730i | −0.0465 − 0.0337i |
| codebook(:, :, 11) = | codebook(:, :, 11) = |
| −0.9146 − 0.0000i | −0.9292 + 0.0000i |
| −0.0456 − 0.0408i | 0.0877 + 0.0279i |
| −0.0528 − 0.0113i | 0.1202 − 0.0339i |
| −0.1082 − 0.0432i | −0.1621 − 0.0597i |
| 0.0075 − 0.0208i | −0.0711 + 0.1258i |
| −0.0808 − 0.1170i | 0.0356 + 0.0161i |
| −0.1209 − 0.1316i | −0.0180 − 0.0533i |
| −0.0552 − 0.0773i | 0.0400 + 0.0808i |
| −0.0764 + 0.0674i | 0.0827 − 0.0158i |
| −0.0176 + 0.0106i | 0.0510 + 0.0694i |
| −0.0348 + 0.0055i | 0.0184 − 0.0401i |
| −0.0706 + 0.1355i | −0.0313 − 0.0082i |
| 0.0296 − 0.0593i | 0.0609 − 0.0170i |
| −0.1045 + 0.0597i | −0.0715 − 0.0700i |
| −0.1278 − 0.0382i | −0.0020 + 0.0464i |
| −0.0041 + 0.0970i | −0.0174 − 0.1228i |
| codebook(:, :, 12) = | codebook(:, :, 12) = |
| 0.8211 | −0.8802 − 0.0000i |
| −0.2039 − 0.0406i | 0.0901 − 0.1238i |
| −0.0530 − 0.0219i | 0.0217 − 0.0094i |
| −0.0000 − 0.0000i | −0.1196 − 0.0402i |
| 0.1362 + 0.1362i | −0.0292 + 0.0680i |
| −0.0478 − 0.0716i | −0.0811 − 0.0633i |
| −0.0124 − 0.0300i | −0.0865 − 0.0749i |
| 0.0000 + 0.0000i | −0.0421 + 0.1065i |
| −0.0000 + 0.1633i | −0.0060 + 0.1416i |
| 0.0168 − 0.0844i | 0.0711 + 0.0372i |
| 0.0147 − 0.0354i | 0.0286 − 0.0546i |
| 0.0000 + 0.0000i | −0.1459 + 0.1135i |

TABLE 3-continued

| 4 bits | 6 bits |
|---|---|
| −0.2039 + 0.2039i | 0.1450 + 0.0487i |
| 0.1728 − 0.1155i | −0.1655 + 0.1570i |
| 0.1509 − 0.0625i | −0.0477 + 0.0213i |
| 0.2085 − 0.0415i | 0.0041 + 0.0190i |
| codebook(:, :, 13) = | codebook(:, :, 13) = |
| 0.9527 | −0.9387 − 0.0000i |
| −0.1177 − 0.0234i | 0.0974 − 0.0397i |
| −0.0435 − 0.0180i | −0.0405 + 0.0127i |
| −0.0155 − 0.0104i | 0.1109 − 0.0019i |
| 0.0854 + 0.0854i | 0.0132 − 0.1080i |
| −0.0219 − 0.0328i | 0.0791 + 0.0898i |
| −0.0089 − 0.0214i | −0.0003 − 0.0123i |
| −0.0023 − 0.0117i | 0.0678 − 0.0139i |
| −0.0000 + 0.0938i | 0.0153 + 0.1005i |
| 0.0071 − 0.0357i | 0.0131 + 0.0032i |
| 0.0096 − 0.0233i | −0.0299 + 0.1198i |
| 0.0085 − 0.0127i | 0.0021 + 0.0368i |
| −0.1041 + 0.1041i | 0.0287 + 0.0424i |
| 0.0614 − 0.0411i | 0.0706 − 0.0275i |
| 0.0707 − 0.0293i | 0.0292 − 0.0019i |
| 0.1185 − 0.0236i | −0.0552 + 0.1521i |
| codebook(:, :, 14) = | codebook(:, :, 14) = |
| 1.0000 | −0.9370 − 0.0000i |
| 0.0000 + 0.0000i | −0.1211 − 0.0460i |
| −0.0000 + 0.0000i | 0.0903 − 0.0443i |
| 0.0000 − 0.0000i | 0.0433 + 0.0100i |
| 0.0000 + 0.0000i | 0.1167 − 0.0468i |
| 0.0000 + 0.0000i | 0.0142 + 0.0009i |
| 0.0000 − 0.0000i | 0.0650 + 0.0379i |
| −0.0000 + 0.0000i | 0.0053 + 0.0618i |
| −0.0000 − 0.0000i | 0.0750 − 0.0267i |
| −0.0000 − 0.0000i | 0.0148 + 0.0058i |
| 0.0000 + 0.0000i | 0.0601 + 0.1085i |
| 0.0000 − 0.0000i | −0.0649 − 0.0100i |
| 0.0000 + 0.0000i | −0.0424 + 0.1741i |
| −0.0000 − 0.0000i | −0.0107 + 0.0281i |
| 0.0000 + 0.0000i | 0.0106 + 0.0643i |
| 0.0000 − 0.0000i | −0.0050 + 0.0641i |
| −0.0000 + 0.0000i | |
| codebook(:, :, 15) = | codebook(:, :, 15) = |
| 0.9527 | −0.9297 − 0.0000i |
| 0.1185 + 0.0236i | 0.1507 + 0.0117i |
| 0.0707 + 0.0293i | −0.0532 − 0.0418i |
| 0.0614 + 0.0411i | −0.0309 − 0.0807i |
| −0.1041 − 0.1041i | 0.1175 + 0.0910i |
| 0.0085 + 0.0127i | 0.0182 + 0.0761i |
| 0.0096 + 0.0233i | 0.0157 − 0.0177i |
| 0.0071 + 0.0357i | −0.0074 − 0.0474i |
| 0.0000 − 0.0938i | −0.0169 + 0.2046i |
| −0.0023 + 0.0117i | 0.0226 − 0.0677i |
| −0.0089 + 0.0214i | 0.0312 + 0.0267i |
| −0.0219 + 0.0328i | 0.0030 + 0.0489i |
| 0.0854 − 0.0854i | 0.0611 − 0.0027i |
| −0.0155 + 0.0104i | −0.0180 + 0.0184i |
| −0.0435 + 0.0180i | 0.0840 + 0.0071i |
| −0.1177 + 0.0234i | 0.0774 + 0.0306i |
| codebook(:, :, 16) = | codebook(:, :, 16) = |
| 0.8211 | −0.8752 − 0.0000i |
| 0.2085 + 0.0415i | 0.0597 + 0.0105i |
| 0.1509 + 0.0625i | −0.0873 + 0.0631i |
| 0.1728 + 0.1155i | −0.0374 − 0.0610i |
| −0.2039 − 0.2039i | 0.0666 − 0.0906i |
| 0.0000 + 0.0000i | −0.0772 − 0.0798i |
| 0.0147 + 0.0354i | −0.0960 − 0.1060i |
| 0.0168 + 0.0844i | 0.0028 + 0.0010i |
| 0.0000 − 0.1633i | −0.1313 + 0.0759i |
| −0.0000 + 0.0000i | −0.0247 − 0.0599i |
| −0.0124 + 0.0300i | −0.0404 + 0.0428i |
| −0.0478 + 0.0716i | −0.0262 + 0.1602i |
| 0.1362 − 0.1362i | 0.0296 − 0.1818i |
| −0.0000 + 0.0000i | −0.1083 + 0.0446i |
| −0.0530 + 0.0219i | −0.1569 − 0.0995i |
| −0.2039 + 0.0406i | 0.0018 + 0.1704i |
| | codebook(:, :, 17) = |
| | −0.9170 − 0.0000i |
| | −0.0557 − 0.0250i |
| | 0.0330 + 0.0302i |
| | −0.0872 − 0.0270i |
| | −0.0686 − 0.0939i |
| | −0.0780 − 0.1029i |
| | −0.0247 − 0.0647i |
| | 0.0570 + 0.1450i |
| | −0.0072 + 0.0142i |
| | 0.0848 − 0.0017i |
| | 0.0600 + 0.0497i |
| | −0.1522 + 0.0827i |
| | −0.0679 − 0.0934i |
| | −0.0871 + 0.0658i |
| | −0.0836 − 0.0530i |
| | −0.0798 + 0.0311i |
| | codebook(:, :, 18) = |
| | −0.9312 + 0.0000i |
| | −0.0620 + 0.0453i |
| | −0.0797 + 0.0290i |
| | −0.1499 − 0.0480i |
| | −0.1528 + 0.0256i |
| | 0.0504 + 0.0352i |
| | 0.0032 − 0.0047i |
| | 0.0923 − 0.0512i |
| | −0.0326 − 0.0686i |
| | −0.0072 + 0.0042i |
| | −0.0579 − 0.0099i |
| | 0.0568 − 0.0947i |
| | −0.0179 − 0.0791i |
| | −0.0360 + 0.0379i |
| | −0.0294 − 0.0315i |
| | −0.0642 − 0.1390i |
| | codebook(:, :, 19) = |
| | −0.9369 + 0.0000i |
| | −0.1630 + 0.1047i |
| | 0.0765 − 0.0753i |
| | −0.0818 − 0.0256i |
| | 0.0501 + 0.0405i |
| | 0.0245 + 0.0111i |
| | 0.0453 − 0.0250i |
| | 0.0118 + 0.0474i |
| | 0.0611 − 0.0939i |
| | −0.0227 − 0.0458i |
| | 0.0594 + 0.0466i |
| | 0.0181 − 0.1002i |
| | −0.1166 − 0.0386i |
| | −0.0802 + 0.0258i |
| | 0.0122 + 0.0208i |
| | 0.0024 − 0.0436i |
| | codebook(:, :, 20) = |
| | −0.9332 + 0.0000i |
| | 0.0864 + 0.1046i |
| | 0.0401 + 0.0549i |
| | −0.0863 − 0.0864i |
| | 0.1040 + 0.0828i |
| | 0.0495 − 0.0397i |
| | 0.0133 − 0.0403i |
| | 0.0782 − 0.0718i |
| | −0.0453 − 0.0494i |
| | −0.0547 − 0.0297i |
| | −0.0638 + 0.0085i |
| | 0.0986 + 0.0472i |
| | 0.0410 − 0.0923i |
| | −0.0639 + 0.0220i |
| | −0.0678 + 0.0154i |
| | 0.0678 − 0.0881i |
| | codebook(:, :, 21) = |
| | −0.9236 + 0.0000i |
| | −0.0597 + 0.0365i |
| | 0.0135 − 0.0829i |
| | −0.0664 + 0.0102i |
| | −0.1997 − 0.0173i |
| | 0.0586 + 0.0651i |
| | −0.0394 − 0.0909i |
| | 0.0378 + 0.1229i |
| | 0.0765 + 0.0106i |
| | 0.0719 + 0.0462i |
| | 0.0424 + 0.0344i |
| | −0.0192 − 0.0895i |
| | −0.0825 − 0.0774i |

TABLE 3-continued

| 4 bits | 6 bits |
| --- | --- |
| | 0.0137 + 0.0102i |
| | 0.0197 − 0.0510i |
| | −0.1229 − 0.0230i |
| | codebook(:, :, 22) = |
| | −0.9357 − 0.0000i |
| | −0.1435 − 0.0328i |
| | −0.0015 + 0.0431i |
| | −0.0441 + 0.0143i |
| | −0.1158 − 0.1278i |
| | −0.0041 − 0.0011i |
| | 0.0140 + 0.0587i |
| | 0.0579 + 0.0178i |
| | 0.0315 − 0.1571i |
| | −0.0081 − 0.0138i |
| | −0.0455 + 0.0857i |
| | −0.0828 − 0.0492i |
| | −0.0579 + 0.0449i |
| | −0.0104 + 0.0098i |
| | −0.0296 + 0.0278i |
| | −0.0982 − 0.0164i |
| | codebook(:, :, 23) = |
| | −0.9300 − 0.0000i |
| | 0.0917 − 0.0387i |
| | −0.0640 + 0.0238i |
| | −0.1552 − 0.0769i |
| | −0.0746 + 0.1086i |
| | 0.0125 + 0.0315i |
| | 0.0045 + 0.0262i |
| | 0.0435 − 0.0331i |
| | −0.0490 + 0.1223i |
| | 0.0668 − 0.0392i |
| | −0.0076 − 0.0413i |
| | −0.0178 − 0.0120i |
| | 0.0853 + 0.0332i |
| | −0.0312 + 0.0761i |
| | 0.0583 − 0.0097i |
| | 0.0200 − 0.1539i |
| | codebook(:, :, 24) = |
| | −0.9204 − 0.0000i |
| | −0.1135 + 0.0136i |
| | 0.0000 + 0.0363i |
| | 0.0347 − 0.0294i |
| | 0.1404 − 0.1551i |
| | 0.0094 − 0.0884i |
| | 0.0256 + 0.0411i |
| | 0.0183 + 0.0037i |
| | −0.0494 − 0.0355i |
| | −0.0545 − 0.0707i |
| | −0.0537 + 0.1370i |
| | −0.0029 + 0.0863i |
| | −0.0888 + 0.0601i |
| | 0.0654 − 0.0665i |
| | −0.0359 + 0.0002i |
| | −0.0046 + 0.1406i |
| | codebook(:, :, 25) = |
| | −0.9165 + 0.0000i |
| | −0.0156 + 0.0247i |
| | 0.0369 − 0.1581i |
| | −0.1828 − 0.0836i |
| | 0.0503 + 0.1611i |
| | −0.0159 + 0.0702i |
| | −0.0134 − 0.0475i |
| | −0.0898 + 0.0829i |
| | 0.0636 + 0.1132i |
| | 0.0461 + 0.0349i |
| | 0.1024 − 0.0325i |
| | −0.0395 − 0.0277i |
| | 0.0016 + 0.0257i |
| | −0.0366 + 0.0343i |
| | 0.0515 + 0.0083i |
| | 0.0359 − 0.0080i |
| | codebook(:, :, 26) = |
| | −0.9089 − 0.0000i |
| | −0.0124 + 0.0003i |
| | 0.0395 − 0.0525i |
| | −0.1054 − 0.0368i |
| | 0.0123 + 0.0583i |
| | 0.0035 − 0.1208i |

TABLE 3-continued

| 4 bits | 6 bits |
| --- | --- |
| | −0.1482 − 0.2161i |
| | −0.0420 + 0.1115i |
| | −0.0253 + 0.0317i |
| | −0.0333 + 0.0851i |
| | −0.0684 + 0.0205i |
| | −0.0030 + 0.1411i |
| | 0.0425 − 0.0189i |
| | −0.0247 + 0.0086i |
| | −0.1317 + 0.0029i |
| | 0.0207 + 0.0152i |
| | codebook(:, :, 27) = |
| | −0.9249 + 0.0000i |
| | 0.0184 − 0.0016i |
| | 0.1353 − 0.0838i |
| | 0.0114 + 0.0206i |
| | −0.0521 + 0.0005i |
| | 0.0492 + 0.0585i |
| | −0.0259 − 0.1076i |
| | 0.0273 + 0.1137i |
| | 0.1677 − 0.0736i |
| | 0.0365 + 0.1184i |
| | 0.0302 + 0.0998i |
| | −0.0778 + 0.0082i |
| | 0.0130 + 0.0256i |
| | −0.0443 + 0.0391i |
| | −0.0608 + 0.0692i |
| | −0.0699 + 0.0170i |
| | codebook(:, :, 28) = |
| | −0.9295 − 0.0000i |
| | 0.0713 + 0.1154i |
| | 0.1264 − 0.1002i |
| | −0.0122 − 0.0462i |
| | 0.1108 + 0.0236i |
| | 0.0636 + 0.0066i |
| | −0.0234 − 0.0598i |
| | −0.0569 − 0.0295i |
| | 0.1227 − 0.0714i |
| | −0.0560 − 0.0083i |
| | −0.0508 + 0.1122i |
| | 0.0155 + 0.0855i |
| | 0.0110 − 0.0208i |
| | −0.0478 − 0.0106i |
| | −0.0459 + 0.0854i |
| | 0.0241 + 0.0724i |
| | codebook(:, :, 29) = |
| | −0.9111 − 0.0000i |
| | −0.0824 + 0.0070i |
| | −0.1296 + 0.0230i |
| | 0.0323 + 0.0154i |
| | −0.1138 − 0.1559i |
| | 0.0192 + 0.0062i |
| | −0.0589 − 0.0851i |
| | 0.0600 + 0.0297i |
| | −0.0856 + 0.0519i |
| | 0.0188 − 0.0298i |
| | −0.0219 + 0.0891i |
| | 0.0204 − 0.0045i |
| | −0.0973 − 0.1213i |
| | 0.0592 − 0.0359i |
| | −0.0565 − 0.1357i |
| | −0.1013 + 0.1030i |
| | codebook(:, :, 30) = |
| | −0.9022 + 0.0000i |
| | 0.2135 + 0.0694i |
| | 0.0011 − 0.0367i |
| | −0.0470 − 0.0590i |
| | −0.0449 + 0.0717i |
| | 0.0690 − 0.0508i |
| | −0.0714 − 0.1024i |
| | −0.0136 + 0.0182i |
| | 0.0166 + 0.1340i |
| | 0.0171 − 0.0493i |
| | −0.0793 − 0.0033i |
| | 0.0417 + 0.1211i |
| | 0.1054 − 0.1114i |
| | −0.1395 + 0.1039i |
| | −0.0208 + 0.0110i |
| | 0.0038 − 0.0094i |

TABLE 3-continued

| 4 bits | 6 bits |
|---|---|
| | codebook(:, :, 31) = |
| | −0.9548 − 0.0000i |
| | −0.0264 − 0.1146i |
| | −0.0342 + 0.0286i |
| | 0.0087 + 0.0023i |
| | 0.0166 + 0.0127i |
| | 0.0247 + 0.0488i |
| | 0.0325 + 0.0459i |
| | 0.0493 − 0.0158i |
| | −0.0281 + 0.0937i |
| | 0.0297 − 0.0187i |
| | 0.0173 + 0.0220i |
| | −0.0298 − 0.0502i |
| | 0.0471 + 0.1830i |
| | 0.0327 + 0.0321i |
| | 0.0903 + 0.0315i |
| | 0.0153 − 0.0310i |
| | codebook(:, :, 32) = |
| | −0.8838 − 0.0000i |
| | −0.1506 − 0.0443i |
| | −0.0411 + 0.0313i |
| | −0.0841 − 0.0280i |
| | −0.0099 − 0.1372i |
| | −0.0662 − 0.2336i |
| | −0.0835 − 0.0379i |
| | −0.0466 + 0.0984i |
| | −0.0889 + 0.0120i |
| | −0.0317 − 0.0666i |
| | −0.0968 + 0.0595i |
| | −0.0921 + 0.1660i |
| | −0.0524 + 0.0238i |
| | −0.0468 + 0.0192i |
| | −0.0857 − 0.0097i |
| | −0.0355 + 0.0930i |
| | codebook(:, :, 33) = |
| | −0.9170 − 0.0000i |
| | 0.1247 − 0.0278i |
| | 0.0056 − 0.1252i |
| | −0.0101 − 0.0021i |
| | −0.1051 + 0.0864i |
| | 0.0752 + 0.0469i |
| | −0.0668 − 0.1131i |
| | −0.0422 + 0.0928i |
| | 0.0974 + 0.1879i |
| | 0.0668 + 0.0469i |
| | 0.0028 + 0.0121i |
| | −0.0287 + 0.0341i |
| | 0.0735 + 0.0424i |
| | −0.0237 + 0.0549i |
| | 0.0769 + 0.0404i |
| | −0.0314 − 0.0002i |
| | codebook(:, :, 34) = |
| | −0.9254 + 0.0000i |
| | −0.0777 − 0.0081i |
| | −0.1148 + 0.0183i |
| | 0.0622 − 0.0251i |
| | 0.1201 − 0.0605i |
| | 0.0199 − 0.0378i |
| | 0.0377 − 0.0461i |
| | 0.0669 − 0.0174i |
| | −0.1110 + 0.1708i |
| | 0.0056 − 0.0709i |
| | 0.0268 + 0.0965i |
| | 0.0326 + 0.0428i |
| | −0.0990 + 0.0099i |
| | 0.0897 − 0.0572i |
| | 0.0401 − 0.0639i |
| | 0.0336 + 0.0622i |
| | codebook(:, :, 35) = |
| | −0.9209 − 0.0000i |
| | −0.0838 − 0.1079i |
| | −0.0089 + 0.0172i |
| | 0.0745 + 0.0396i |
| | −0.0863 − 0.1657i |
| | 0.0338 − 0.0407i |
| | 0.0086 + 0.0039i |
| | 0.0679 + 0.0968i |
| | 0.0295 + 0.0418i |
| | 0.0595 + 0.0499i |
| | −0.0066 + 0.1083i |
| | −0.0882 + 0.0381i |
| | −0.0445 + 0.1247i |
| | 0.0590 + 0.0073i |
| | −0.0020 + 0.0046i |
| | −0.1211 + 0.0931i |
| | codebook(:, :, 36) = |
| | −0.9583 − 0.0000i |
| | 0.0012 − 0.0319i |
| | −0.0531 + 0.1083i |
| | −0.0098 − 0.0281i |
| | 0.0345 − 0.0335i |
| | 0.0385 + 0.0393i |
| | 0.0231 + 0.0518i |
| | 0.0991 − 0.1040i |
| | −0.0933 − 0.0353i |
| | −0.0300 − 0.0429i |
| | −0.0655 + 0.0519i |
| | 0.0518 − 0.0280i |
| | 0.0375 + 0.0650i |
| | 0.0622 − 0.0186i |
| | −0.0132 − 0.0148i |
| | 0.0205 − 0.0466i |
| | codebook(:, :, 37) = |
| | −0.9068 − 0.0000i |
| | −0.1121 + 0.0026i |
| | −0.1273 + 0.1015i |
| | −0.0711 − 0.0462i |
| | 0.0655 − 0.0154i |
| | −0.0128 − 0.0877i |
| | −0.0481 − 0.0888i |
| | 0.0749 − 0.0899i |
| | −0.1896 − 0.0296i |
| | −0.0867 − 0.0280i |
| | −0.0971 + 0.0360i |
| | 0.0835 + 0.0441i |
| | −0.0109 − 0.0506i |
| | 0.0100 − 0.0198i |
| | −0.1338 − 0.0663i |
| | 0.0518 + 0.0469i |
| | codebook(:, :, 38) = |
| | −0.9364 − 0.0000i |
| | −0.0212 − 0.0750i |
| | −0.0474 − 0.0116i |
| | −0.0697 − 0.0353i |
| | 0.0276 − 0.0321i |
| | −0.0497 + 0.0618i |
| | −0.1025 − 0.1138i |
| | −0.0073 + 0.0595i |
| | −0.0743 + 0.0773i |
| | 0.0215 + 0.0721i |
| | 0.0401 + 0.0321i |
| | −0.0400 + 0.0323i |
| | 0.0417 − 0.0162i |
| | 0.0107 + 0.0146i |
| | −0.1180 − 0.1012i |
| | −0.0252 + 0.1549i |
| | codebook(:, :, 39) = |
| | −0.8904 − 0.0000i |
| | 0.1091 + 0.0128i |
| | −0.0099 − 0.0959i |
| | −0.0871 − 0.0938i |
| | 0.1224 + 0.0005i |
| | −0.0429 − 0.0027i |
| | −0.0941 − 0.0645i |
| | −0.1317 + 0.0281i |
| | 0.0313 + 0.0917i |
| | −0.0472 − 0.0012i |
| | −0.0488 + 0.0610i |
| | −0.0723 + 0.1791i |
| | 0.0804 − 0.0271i |
| | −0.0691 + 0.0067i |
| | −0.0627 − 0.0380i |
| | 0.0258 + 0.2199i |
| | codebook(:, :, 40) = |
| | −0.9030 − 0.0000i |
| | 0.1471 − 0.0259i |

TABLE 3-continued

| 4 bits | 6 bits |
|---|---|
| | 0.0141 + 0.0353i |
| | 0.0164 − 0.0212i |
| | 0.0169 − 0.0043i |
| | 0.0367 + 0.0004i |
| | −0.0829 − 0.1109i |
| | 0.0362 − 0.0355i |
| | 0.0147 − 0.0371i |
| | −0.0539 + 0.0899i |
| | −0.1094 + 0.0449i |
| | 0.0180 + 0.1159i |
| | 0.1691 − 0.0311i |
| | −0.1356 + 0.0960i |
| | −0.1742 + 0.0460i |
| | −0.0182 + 0.0801i |
| | codebook(:, :, 41) = |
| | −0.9301 − 0.0000i |
| | 0.0141 − 0.0650i |
| | 0.0753 + 0.0749i |
| | −0.0181 − 0.0339i |
| | 0.1175 − 0.0633i |
| | 0.0100 + 0.0212i |
| | −0.0203 + 0.0310i |
| | 0.0392 − 0.0342i |
| | −0.0133 − 0.1301i |
| | −0.0505 + 0.0298i |
| | −0.0757 + 0.1064i |
| | −0.0257 + 0.0599i |
| | 0.1015 + 0.1438i |
| | 0.0090 + 0.0119i |
| | −0.1223 + 0.0481i |
| | 0.0142 + 0.0697i |
| | codebook(:, :, 42) = |
| | −0.9088 + 0.0000i |
| | −0.0671 + 0.1449i |
| | −0.0466 + 0.0066i |
| | 0.0045 − 0.0487i |
| | 0.1063 − 0.0597i |
| | 0.0224 − 0.1374i |
| | 0.0151 − 0.0558i |
| | 0.0199 − 0.0245i |
| | −0.0743 + 0.0082i |
| | −0.0595 − 0.1326i |
| | −0.0508 + 0.0838i |
| | 0.0858 + 0.0857i |
| | −0.1160 − 0.1633i |
| | −0.0736 − 0.0008i |
| | −0.0642 − 0.0473i |
| | 0.0258 + 0.0429i |
| | codebook(:, :, 43) = |
| | −0.9255 + 0.0000i |
| | −0.1152 + 0.0436i |
| | −0.0608 − 0.1027i |
| | −0.0262 − 0.0170i |
| | 0.0649 + 0.0497i |
| | −0.0250 − 0.0818i |
| | −0.0266 − 0.1383i |
| | −0.0559 + 0.0530i |
| | −0.0202 + 0.1152i |
| | −0.0073 − 0.0335i |
| | 0.0508 + 0.0176i |
| | 0.0112 + 0.0366i |
| | −0.0573 − 0.0858i |
| | −0.1652 + 0.0971i |
| | −0.0558 − 0.0311i |
| | 0.0252 + 0.0451i |
| | codebook(:, :, 44) = |
| | −0.9133 − 0.0000i |
| | −0.0177 − 0.0037i |
| | −0.0908 + 0.0713i |
| | −0.0350 − 0.0318i |
| | −0.0566 − 0.1628i |
| | 0.0070 + 0.0103i |
| | −0.0711 + 0.0004i |
| | 0.0314 − 0.0656i |
| | −0.0550 − 0.1195i |
| | −0.0809 + 0.0015i |
| | −0.1518 + 0.0985i |
| | 0.0040 + 0.0611i |
| | 0.0258 − 0.0560i |
| | 0.0065 − 0.0262i |
| | −0.1415 − 0.0265i |
| | −0.0840 + 0.1305i |
| | codebook(:, :, 45) = |
| | −0.8997 + 0.0000i |
| | −0.1586 − 0.0972i |
| | 0.0706 − 0.0957i |
| | −0.0545 + 0.0226i |
| | 0.0146 + 0.0398i |
| | − 0.0702 + 0.0010i |
| | −0.0150 − 0.0795i |
| | −0.0398 + 0.1517i |
| | 0.0731 + 0.0269i |
| | 0.0657 + 0.0774i |
| | 0.1400 + 0.0144i |
| | −0.1406 − 0.0353i |
| | −0.0131 + 0.1033i |
| | −0.1241 + 0.1171i |
| | −0.0403 + 0.0215i |
| | −0.0211 + 0.0283i |
| | codebook(:, :, 46) = |
| | −0.9103 − 0.0000i |
| | 0.0390 − 0.0044i |
| | 0.1701 − 0.0280i |
| | −0.1450 − 0.0892i |
| | 0.1991 + 0.0939i |
| | −0.0435 + 0.0252i |
| | −0.0327 − 0.0458i |
| | −0.0269 + 0.0680i |
| | 0.0320 − 0.0481i |
| | −0.0123 + 0.0460i |
| | 0.0542 + 0.0220i |
| | −0.0624 + 0.0563i |
| | 0.0835 + 0.0624i |
| | −0.0688 + 0.0413i |
| | −0.0842 + 0.0451i |
| | 0.0772 + 0.0559i |
| | codebook(:, :, 47) = |
| | −0.9200 + 0.0000i |
| | −0.0203 − 0.1267i |
| | 0.0708 + 0.0614i |
| | −0.0922 − 0.0045i |
| | −0.1002 − 0.0214i |
| | −0.0276 − 0.0249i |
| | −0.0045 + 0.0291i |
| | 0.0683 + 0.0686i |
| | 0.0370 − 0.0691i |
| | 0.0677 + 0.0521i |
| | −0.0018 + 0.0258i |
| | −0.1430 + 0.0096i |
| | 0.0817 + 0.1350i |
| | −0.0835 + 0.1184i |
| | −0.0564 + 0.0534i |
| | −0.0600 − 0.0869i |
| | codebook(:, :, 48) = |
| | −0.9445 + 0.0000i |
| | 0.0701 + 0.1507i |
| | 0.0121 − 0.1009i |
| | −0.0337 − 0.0520i |
| | 0.0041 + 0.0776i |
| | 0.1020 + 0.0531i |
| | 0.0176 − 0.0564i |
| | 0.0015 − 0.0002i |
| | 0.0535 + 0.0673i |
| | 0.0189 − 0.0595i |
| | 0.0098 + 0.0503i |
| | 0.0989 − 0.0240i |
| | −0.0460 − 0.1119i |
| | −0.0210 + 0.0075i |
| | 0.0420 − 0.0229i |
| | 0.0072 − 0.0412i |
| | codebook(:, :, 49) = |
| | −0.9400 − 0.0000i |
| | 0.1034 − 0.0677i |
| | −0.0039 + 0.0433i |
| | 0.0065 + 0.0065i |

TABLE 3-continued

| 4 bits | 6 bits |
|---|---|
| | −0.1735 − 0.0510i |
| | 0.0971 + 0.0512i |
| | −0.0193 + 0.0046i |
| | 0.0989 + 0.0154i |
| | 0.0366 + 0.0220i |
| | 0.0582 + 0.0611i |
| | −0.0681 + 0.0384i |
| | −0.0039 − 0.0075i |
| | 0.0904 + 0.0645i |
| | 0.0119 + 0.0594i |
| | −0.0051 + 0.0107i |
| | −0.1099 − 0.0251i |
| | codebook(:, :, 50) = |
| | −0.9608 + 0.0000i |
| | −0.1325 + 0.0504i |
| | −0.0679 − 0.0073i |
| | 0.0404 + 0.0175i |
| | −0.0193 − 0.0541i |
| | 0.0459 + 0.0154i |
| | 0.0439 − 0.0069i |
| | 0.0544 − 0.0284i |
| | −0.0245 − 0.0182i |
| | −0.0121 − 0.0479i |
| | 0.0064 + 0.0670i |
| | 0.0615 − 0.0786i |
| | −0.1176 − 0.0367i |
| | 0.0366 − 0.0306i |
| | 0.0161 − 0.0438i |
| | −0.0291 − 0.0207i |
| | codebook(:, :, 51) = |
| | −0.9209 + 0.0000i |
| | −0.0762 + 0.0821i |
| | 0.0532 + 0.0439i |
| | −0.0729 − 0.0371i |
| | 0.0487 − 0.0296i |
| | 0.0281 − 0.0631i |
| | −0.0268 − 0.0385i |
| | 0.0418 − 0.0418i |
| | 0.0032 − 0.2144i |
| | −0.1257 − 0.0385i |
| | −0.1296 + 0.0849i |
| | 0.0292 + 0.0292i |
| | −0.0111 − 0.0415i |
| | −0.0773 − 0.0036i |
| | −0.1029 + 0.0754i |
| | 0.0127 − 0.0308i |
| | codebook(:, :, 52) = |
| | −0.9183 − 0.0000i |
| | 0.0593 − 0.0607i |
| | −0.0107 + 0.1121i |
| | −0.0448 − 0.0876i |
| | 0.2139 − 0.0257i |
| | −0.0290 − 0.0087i |
| | −0.0117 − 0.0006i |
| | 0.0698 − 0.0406i |
| | −0.1453 + 0.0861i |
| | −0.0253 − 0.0519i |
| | −0.0113 + 0.0521i |
| | −0.0064 + 0.0934i |
| | 0.0692 + 0.0609i |
| | 0.0377 − 0.0160i |
| | −0.0369 − 0.0318i |
| | 0.0836 + 0.1005i |
| | codebook(:, :, 53) = |
| | −0.9021 + 0.0000i |
| | −0.2871 − 0.0566i |
| | −0.1142 − 0.0544i |
| | 0.0147 + 0.0456i |
| | −0.0343 − 0.0601i |
| | −0.0414 − 0.0991i |
| | −0.0029 − 0.0839i |
| | −0.0090 + 0.0873i |
| | −0.0592 + 0.0930i |
| | 0.0246 − 0.0110i |
| | 0.0656 + 0.0399i |
| | −0.0422 − 0.0288i |
| | −0.1522 + 0.0327i |
| | −0.0105 + 0.0200i |
| | −0.0027 − 0.0590i |
| | −0.0365 + 0.0167i |
| | codebook(:, :, 54) = |
| | −0.9395 − 0.0000i |
| | 0.1234 − 0.0621i |
| | 0.0632 − 0.0522i |
| | 0.0485 − 0.0089i |
| | 0.0756 + 0.0478i |
| | 0.0447 + 0.0815i |
| | −0.0011 − 0.0280i |
| | −0.0061 + 0.0151i |
| | 0.0921 + 0.0750i |
| | 0.0165 − 0.0695i |
| | 0.0160 + 0.0458i |
| | −0.0350 + 0.0406i |
| | 0.1194 + 0.1218i |
| | −0.0416 + 0.0573i |
| | 0.0106 + 0.0839i |
| | 0.0130 + 0.0744i |
| | codebook(:, :, 55) = |
| | −0.9392 − 0.0000i |
| | 0.1277 + 0.0828i |
| | 0.0006 + 0.0042i |
| | 0.0686 − 0.0462i |
| | 0.1299 − 0.0582i |
| | 0.0475 + 0.0340i |
| | 0.0036 − 0.0178i |
| | 0.0162 − 0.0606i |
| | 0.0041 + 0.0189i |
| | −0.0473 − 0.0584i |
| | −0.0504 + 0.1087i |
| | 0.0497 + 0.0915i |
| | 0.0135 − 0.0820i |
| | −0.0020 − 0.0343i |
| | −0.0359 + 0.0013i |
| | 0.0212 + 0.1372i |
| | codebook(:, :, 56) = |
| | −0.9259 − 0.0000i |
| | −0.0650 + 0.1012i |
| | 0.0265 − 0.0698i |
| | 0.0816 + 0.0131i |
| | 0.0142 − 0.1291i |
| | 0.0383 + 0.0006i |
| | 0.0165 − 0.0456i |
| | 0.0027 + 0.0454i |
| | 0.0930 − 0.0608i |
| | −0.0151 − 0.0644i |
| | −0.0018 + 0.1734i |
| | −0.0264 + 0.0293i |
| | −0.1280 − 0.0931i |
| | −0.0359 − 0.0194i |
| | −0.0317 + 0.0077i |
| | −0.0631 + 0.1139i |
| | codebook(:, :, 57) = |
| | −0.9025 − 0.0000i |
| | −0.0927 − 0.1592i |
| | −0.0831 − 0.0494i |
| | −0.0662 − 0.0140i |
| | 0.0408 + 0.0739i |
| | −0.0525 − 0.0014i |
| | −0.0212 − 0.0250i |
| | −0.0478 + 0.0376i |
| | −0.0295 + 0.1932i |
| | 0.0132 − 0.0122i |
| | 0.0455 − 0.0257i |
| | −0.1069 − 0.0066i |
| | 0.0632 + 0.1892i |
| | −0.0812 + 0.0914i |
| | 0.0965 + 0.0625i |
| | 0.0432 + 0.0213i |
| | codebook(:, :, 58) = |
| | −0.9295 − 0.0000i |
| | −0.2288 − 0.0367i |
| | −0.0244 + 0.0503i |
| | −0.0671 − 0.0195i |
| | 0.0977 − 0.0286i |

TABLE 3-continued

| 4 bits | 6 bits |
|---|---|
| | −0.0268 − 0.1093i |
| | 0.0222 + 0.0214i |
| | 0.0291 − 0.0061i |
| | −0.0878 − 0.0464i |
| | −0.0722 − 0.0873i |
| | −0.0334 + 0.0395i |
| | −0.0170 − 0.0180i |
| | −0.0655 + 0.1138i |
| | −0.0310 + 0.0091i |
| | 0.0145 + 0.0414i |
| | 0.0463 − 0.0328i |
| | codebook(:, :, 59) = |
| | −0.9338 + 0.0000i |
| | 0.1266 + 0.0201i |
| | −0.1067 + 0.0745i |
| | 0.0235 − 0.0305i |
| | −0.0407 − 0.0316i |
| | 0.0728 + 0.0690i |
| | −0.0302 − 0.0393i |
| | 0.0951 − 0.0970i |
| | −0.0963 + 0.0668i |
| | 0.0045 − 0.0496i |
| | −0.0696 + 0.0501i |
| | 0.1024 + 0.0027i |
| | 0.0681 − 0.0921i |
| | −0.0042 + 0.0329i |
| | −0.0552 − 0.0889i |
| | −0.0186 + 0.0069i |
| | codebook(:, :, 60) = |
| | 0.8211 |
| | −0.2039 − 0.0406i |
| | −0.0530 − 0.0219i |
| | −0.0000 + 0.0000i |
| | 0.1362 + 0.1362i |
| | −0.0478 − 0.0716i |
| | −0.0124 − 0.0300i |
| | 0.0000 + 0.0000i |
| | −0.0000 + 0.1633i |
| | 0.0168 − 0.0844i |
| | 0.0147 − 0.0354i |
| | 0.0000 + 0.0000i |
| | −0.2039 + 0.2039i |
| | 0.1728 − 0.1155i |
| | 0.1509 − 0.0625i |
| | 0.2085 − 0.0415i |
| | codebook(:, :, 61) = |
| | 0.9527 |
| | −0.1177 − 0.0234i |
| | −0.0435 − 0.0180i |
| | −0.0155 − 0.0104i |
| | 0.0854 + 0.0854i |
| | −0.0219 + 0.0328i |
| | −0.0089 − 0.0214i |
| | −0.0023 + 0.0117i |
| | −0.0000 + 0.0938i |
| | 0.0071 − 0.0357i |
| | 0.0096 − 0.0233i |
| | 0.0085 − 0.0127i |
| | −0.1041 + 0.1041i |
| | 0.0614 − 0.0411i |
| | 0.0707 − 0.0293i |
| | 0.1185 − 0.0236i |
| | codebook(:, :, 62) = |
| | 1.0000 |
| | 0.0000 + 0.0000i |
| | −0.0000 + 0.0000i |
| | 0.0000 − 0.0000i |
| | 0.0000 + 0.0000i |
| | 0.0000 + 0.0000i |
| | 0.0000 − 0.0000i |
| | −0.0000 + 0.0000i |
| | −0.0000 + 0.0000i |
| | −0.0000 − 0.0000i |
| | 0.0000 − 0.0000i |
| | 0.0000 − 0.0000i |
| | −0.0000 − 0.0000i |
| | 0.0000 + 0.0000i |
| | 0.0000 − 0.0000i |
| | −0.0000 + 0.0000i |
| | codebook(:, :, 63) = |
| | 0.9527 |
| | 0.1185 + 0.0236i |
| | 0.0707 + 0.0293i |
| | 0.0614 + 0.0411i |
| | −0.1041 − 0.1041i |
| | 0.0085 + 0.0127i |
| | 0.0096 + 0.0233i |
| | 0.0071 + 0.0357i |
| | 0.0000 − 0.0938i |
| | −0.0023 + 0.0117i |
| | −0.0089 + 0.0214i |
| | −0.0219 + 0.0328i |
| | 0.0854 − 0.0854i |
| | −0.0155 + 0.0104i |
| | −0.0435 + 0.0180i |
| | −0.1177 + 0.0234i |
| | codebook(:, :, 64) = |
| | 0.8211 |
| | 0.2085 + 0.0415i |
| | 0.1509 + 0.0625i |
| | 0.1728 + 0.1155i |
| | −0.2039 − 0.2039i |
| | 0.0000 + 0.0000i |
| | 0.0147 + 0.0354i |
| | 0.0168 + 0.0844i |
| | 0.0000 − 0.1633i |
| | −0.0000 + 0.0000i |
| | −0.0124 + 0.0300i |
| | −0.0478 + 0.0716i |
| | 0.1362 − 0.1362i |
| | −0.0000 + 0.0000i |
| | −0.0530 + 0.0219i |
| | −0.2039 + 0.0406i |

The aforementioned examples may be applicable to various types of communication apparatuses performing a functionality of a receiver and a transmitter. For example, a terminal may perform a functionality of the receiver in a downlink or a transmitter in an uplink. Conversely, a base station may perform a functionality of the transmitter in the downlink and a receiver in the uplink.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of a transmitter, the method comprising:
   recognizing a previous preferred codeword of a receiver;
   calculating a rotation matrix based on the previous preferred codeword of the receiver and a random codeword included in a discrete Fourier transform (DFT) codebook; and
   generating a new codebook by rotating a reference codebook using the rotation matrix, or recognizing a new preferred codeword by rotating at least one codeword included in the reference codebook using the rotation matrix.

2. The method for claim 1, wherein the calculating of the rotation matrix comprises calculating the rotation matrix according to the following equation:

$$R = [\tilde{w}_p \ \tilde{w}_p^\perp][\tilde{w}_i \tilde{w}_i^\perp]^H,$$

wherein R refers to the rotation matrix, $\tilde{w}_p$ refers to the previous preferred codeword of the receiver, $\tilde{w}_i$ refers to the random codeword among the codewords comprised in the DFT codebook, $[\tilde{w}_p \ \tilde{w}_p^{195}]$ refers to a unitary matrix associated with $\tilde{w}_p$, $[\tilde{w}_i \ \tilde{w}_i^\perp]$ refers to a predefined unitary matrix associated with $\tilde{w}_i$, and H refers to a Hermitian.

3. The method for claim 2, wherein, when the previous preferred codeword $\tilde{w}_p$ of the receiver corresponds to the random codeword included in the DFT codebook, $[\tilde{w}_p \ \tilde{w}_p^\perp]$ is represented according to the following equation:

$$[\tilde{w}_p \ \tilde{w}_p^\perp] = \begin{bmatrix} \tilde{w}_{p1} & \cdots & \cdots \\ \cdots & \tilde{w}_{pn}\exp\left\{j\frac{2\pi}{n_t}(n-1)(m-1)\right\} & \cdots \\ \tilde{w}_{pn_t} & \cdots & \cdots \end{bmatrix},$$

wherein $\tilde{w}_{pn}$ refers to an $n^{th}$ element of $\tilde{w}_p$, n refers to an $n^{th}$ row of $[\tilde{w}_p \ \tilde{w}_p^\perp]$, m refers to an $m^{th}$ column of $[\tilde{w}_p \ \tilde{w}_p^\perp]$, and $n_t$ refers to a number of transmit antennas.

4. The method for claim 2, wherein, when the previous preferred codeword $\tilde{w}_p$ of the receiver is not included in the codewords of the DFT codebook, $[\tilde{w}_p \ \tilde{w}_p^\perp]$ is generated by orthogonalizing a matrix of the following equation:

$$\begin{bmatrix} \tilde{w}_{p1} & \cdots & \cdots \\ \cdots & \tilde{w}_{pn}\exp\left\{j\frac{2\pi}{n_t}(n-1)(m-1)\right\} & \cdots \\ \tilde{w}_{pn_t} & \cdots & \cdots \end{bmatrix},$$

wherein $\tilde{w}_{pn}$ refers to an $n^{th}$ element of $\tilde{w}_p$, n refers to an $n^{th}$ row of the matrix of the equation, m refers to an $m^{th}$ column of the matrix of the equation, and $n_t$ refers to a number of transmit antennas.

5. The method for claim 1, wherein the calculating of the rotation matrix comprises generating $[\tilde{w}_p \ \tilde{w}_p^\perp]$ based on the previous preferred codeword $w_p$ of the receiver by employing a Gram-Schmidt orthogonalization.

6. The method for claim 1, wherein, when the previous preferred codeword of the receiver corresponds to one of the codewords included in the DFT codebook, the calculating of the rotation matrix comprises calculating the rotation matrix into a diagonal matrix form.

7. The method for claim 1, further comprising:
   receiving, from the receiver, information associated with the new preferred codeword; and
   recognizing the new preferred codeword based on information about the new preferred codeword, or recognizing the new preferred codeword using a codeword corresponding to information about the new preferred codeword included in the reference codebook and the rotation matrix.

8. The method for claim 1, wherein the reference codebook comprises codewords of a polar cap codebook and the codewords of the DFT codebook, the codewords of the polar cap codebook surrounding a random reference codeword.

9. A method of a receiver, the method comprising:
   calculating a rotation matrix such that when codewords of a DFT codebook, included in a reference codebook, are rotated using the rotation matrix, the rotated codewords are expressed as codewords of the DFT codebook, in response to a previous preferred codeword of the receiver corresponding to one of the codewords of the DFT codebook; and
   generating a new codebook by rotating the reference codebook using the rotation matrix, or generating a new preferred codeword by rotating at least one codeword included in the reference codebook using the rotation matrix.

10. The method for claim 9, wherein the calculating of the rotation matrix comprises calculating the rotation matrix based on the previous preferred codeword and a random codeword included in the DFT codebook.

11. The method for claim 9, wherein the calculating of the rotation matrix comprises calculating the rotation matrix according to the following equation:

$$R=[\tilde{w}_p \ \tilde{w}_p^\perp][\tilde{w}_i \ \tilde{w}_i^\perp]^H,$$

wherein R refers to the rotation matrix, $\tilde{w}_p$ refers to the previous preferred codeword, $\tilde{w}_i$ refers to the random codeword among the codewords comprised in the DFT codebook, $[\tilde{w}_p \ \tilde{w}_p^\perp]$ refers to a predefined unitary matrix associated with $\tilde{w}_p$, $[\tilde{w}_i \ \tilde{w}_i^\perp]$ refers to a unitary matrix associated with $\tilde{w}_i$, and H refers to a Hermitian.

12. The method for claim 11, wherein, when the previous preferred codeword $\tilde{w}_p$ corresponds to the random codeword included in the DFT codebook, $[\tilde{w}_p \ \tilde{w}_p^\perp]$ is represented according to the following equation:

$$[\tilde{w}_p \ \tilde{w}_p^\perp] = \begin{bmatrix} \tilde{w}_{p1} & \cdots & \cdots \\ \cdots & \tilde{w}_{pn}\exp\left\{j\frac{2\pi}{n_t}(n-1)(m-1)\right\} & \cdots \\ \tilde{w}_{pn_t} & \cdots & \cdots \end{bmatrix},$$

wherein $\tilde{w}_{pn}$ refers to an $n^{th}$ element of $\tilde{w}_p$, n refers to an $n^{th}$ row of $[\tilde{w}_p \ \tilde{w}_p^\perp]$, m refers to an $m^{th}$ column of $[\tilde{w}_p \ \tilde{w}_p^\perp]$, and $n_t$ refers to a number of transmit antennas installed in a transmitter.

13. The method for claim 11, wherein, when the previous preferred codeword $\tilde{w}_p$ is not included in the codewords of the DFT codebook, $[\tilde{w}_p \ \tilde{w}_p^\perp]$ is generated by orthogonalizing a matrix of the following equation:

$$\begin{bmatrix} \tilde{w}_{p1} & \cdots & \cdots \\ \cdots & \tilde{w}_{pn}\exp\left\{j\frac{2\pi}{n_t}(n-1)(m-1)\right\} & \cdots \\ \tilde{w}_{pn_t} & \cdots & \cdots \end{bmatrix},$$

wherein $\tilde{w}_{pn}$ refers to an $n^{th}$ element of $\tilde{w}_p$, n refers to an $n^{th}$ row of the matrix of the equation, m refers to an $n^{th}$ column of the matrix of the equation, and $n_t$ refers to a number of transmit antennas installed in a transmitter.

14. The method for claim 9, further comprising:
determining a new preferred codeword based on the new codebook, or determining the new preferred codeword based on at least one codeword included in the reference codebook and the rotation matrix; and
feeding back, to a transmitter, information associated with the new preferred codeword,
wherein information associated with the new preferred codeword comprises information about an index of the new preferred codeword in the new codebook or information about an index of a codeword corresponding to the new preferred codeword in the reference codebook.

15. A non-transitory computer-readable storage medium comprising a program for causing a processor to implement a method for a transmitter, the method comprising:
recognizing a previous preferred codeword of a receiver;
calculating a rotation matrix based on the previous preferred codeword of the receiver and a random codeword included in a discrete Fourier transform (DFT) codebook; and
generating a new codebook by rotating a reference codebook using the rotation matrix, or recognizing a new preferred codeword by rotating at least one codeword in the reference codebook using the rotation matrix.

16. A transmitter, comprising:
a recognition unit configured to recognize a previous preferred codeword of a receiver;
a calculator configured to calculate a rotation matrix based on the previous preferred codeword of the receiver and a random codeword included in a DFT codebook; and
a generator configured to generate a new codebook by rotating a reference codebook using the rotation matrix or to recognize a new preferred codeword of the receiver by rotating at least one codeword included in the reference codebook using the rotation matrix.

17. A receiver, comprising:
a calculator configured to calculate a rotation matrix such that when codewords of a DFT codebook, included in a reference codebook, are rotated using the rotation matrix, the rotated codewords are expressed as codewords of the DFT codebook, in response to a previous preferred codeword of the receiver corresponding to one of the codewords of the DFT codebook; and
a generator configured to generate a new codebook by rotating the reference codebook using the rotation matrix or to generate a new preferred codeword by rotating at least one codeword included in the reference codebook using the rotation matrix.

18. A method of a receiver, the method comprising:
vectorizing information associated with a previous explicit channel matrix between a transmitter and the receiver, in order to obtain vectorized channel information;
selecting a previous preferred codeword based on the vectorized channel information;
calculating a rotation matrix based on the previous preferred codeword; and
generating a new codebook by rotating a reference codebook using the rotation matrix, or generating a new preferred codeword by rotating at least one codeword included in the reference codebook using the rotation matrix.

19. The method for claim 18, wherein the reference codebook is determined based on codewords of a polar cap codebook, and the codewords of the polar cap codebook surround a random reference codeword and the codewords of the DFT codebook.

20. The method for claim 19, wherein:
the elements included in the random reference codeword are $$\frac{1}{\sqrt{N_t^2}};$$

and $N_t$ refers to a number of transmit antennas installed in the transmitter.

21. The method for claim 18, wherein:
each codeword included in the reference codebook has a dimension of $N_t^2 \times 1$; and
$N_t$ refers to a number of transmit antennas installed in the transmitter.

22. The method for claim 19, wherein the reference codebook is determined based on chordal distances between the codewords of the polar cap codebook and the codewords of the DFT codebook.

23. The method for claim 18, wherein the vectorizing comprises vectorizing the explicit channel matrix to a single vector, or vectorizing information generated by processing the explicit channel matrix to a single vector, in order to obtain the vectorized channel information.

24. The method for claim 18, wherein the selecting of the previous preferred codeword comprises selecting the previous preferred codeword from a plurality of codewords included in a previous codebook or a basic codebook.

25. The method for claim 18, further comprising:
feeding back, to the transmitter, information associated with the new preferred codeword, the information associated with the new preferred codeword comprising information about an index of the new preferred codeword in the new codebook or information about an index of a codeword corresponding to the new preferred codeword in the reference codebook.

26. The method for claim 19, wherein the calculating of the rotation matrix comprises calculating the rotation matrix based on the random reference codebook and the previous preferred codeword.

27. A method of a transmitter, the method comprising:
recognizing a previous preferred codeword selected by a receiver based on a previous explicit channel matrix between the transmitter and the receiver;
calculating a rotation matrix based on the previous preferred codeword; and
generating a new codebook by rotating a reference codebook using the rotation matrix, or generating a new preferred codeword by rotating at least one codeword included in the reference codebook using the rotation matrix.

28. The method for claim 27, wherein:
the reference codebook is determined based on codewords of a polar cap codebook; and
the codewords of the polar cap codebook surround a random reference codeword and the codewords of the DFT codebook.

29. The method for claim 28, wherein:
each of codewords included in the reference codebook has a dimension of $N_t^2 \times 1$; and
$N_t$ refers to a number of transmit antennas installed in the transmitter.

30. The method for claim 28, wherein the reference codebook is determined based on chordal distances between the codewords of the polar cap codebook and the codewords of the DFT codebook.

31. The method for claim 27, further comprising:
receiving, from the receiver, information associated with the new preferred codeword; and
recognizing the new preferred codeword using the new codebook based on information associated with the new preferred codeword, or recognizing the new preferred codeword using a codeword corresponding to information associated with the new preferred codeword from among codewords comprised in the reference codebook and the rotation matrix.

32. The method for claim 27, wherein the calculating of the rotation matrix comprises:
vectorizing the previous preferred codeword; and
calculating the rotation matrix based on the vectorized previous preferred codeword.

33. A receiver, comprising:
a vectorization unit configured to vectorize information associated with a previous explicit channel matrix between a transmitter and the receiver, in order to obtain vectorized channel information;
a selector configured to select a previous preferred codeword based on the vectorized channel information;
a calculator configured to calculate a rotation matrix based on the previous preferred codeword; and
a generator configured to generate a new codebook by rotating a reference codebook using the rotation matrix or to generate a new preferred codeword by rotating at least one codeword included in the reference codebook using the rotation matrix.

34. A transmitter, comprising:
a recognition unit configured to recognize a previous preferred codeword selected by a receiver based on a previous explicit channel matrix between the transmitter and the receiver;
a calculator configured to calculate a rotation matrix based on the previous preferred codeword; and
a generator configured to generate the a new codebook by rotating a reference codebook using the rotation matrix or to generate a new preferred codeword by rotating at least one codeword included in the reference codebook using the rotation matrix.

35. A method of a transmitter, the method comprising:
recognizing a previous preferred codeword of a receiver;
accessing a memory that has pre-stored therein a product between a reference codebook and a matrix based on a reference codeword, the reference codeword being a codeword of a DFT codebook, the reference codebook comprising codewords of a polar cap codebook, the codewords of the polar cap codebook surrounding the reference codeword and the codewords of the DFT codebook; and
generating a new codebook based on the product, using the previous preferred codeword, or generating a new preferred codeword based on the product, using the previous preferred codeword.

36. The method for claim 35, further comprising:
receiving, from the receiver, information associated with the new preferred codeword; and
recognizing the new preferred codeword using the new codebook based on information associated with the new preferred codeword, or recognizing the new preferred codeword by extracting a codeword corresponding to information associated with the new preferred codeword from the product between the reference codeword and the reference codebook.

37. The method for claim 36, wherein information associated with the new preferred codeword comprises information about an index of the new preferred codeword in the new codebook or information about an index of a codeword corresponding to the new preferred codeword in the product between the reference codeword and the reference codebook.

38. A method of a receiver, the method comprising:
accessing a memory that has pre-stored therein a product between a reference codebook and a matrix based on a reference codeword, the reference codeword being a codeword of a DFT codebook, the reference codebook comprising codewords of a polar cap codebook, the codewords of the polar cap codebook surrounding the reference codeword and the codewords of the DFT codebook; and
generating a new codebook based on the product, using the previous preferred codeword, or generating a new preferred codeword from the product, using the previous preferred codeword.

39. The method for claim 38, further comprising:
determining the new preferred codeword based on the new codebook, or determining the new preferred codeword based on at least one codeword extracted from the product; and feeding back, to a transmitter, information associated with the new preferred codeword, the information associated with the new preferred codeword comprising: information about an index of the new preferred codeword in the new codebook; or information about an index of a codeword corresponding to the new preferred codeword in the reference codebook.

40. A method of a transmitter, the method comprising:

receiving, from a receiver, information associated with at least one candidate pre-stored in a memory;

determining a rotation matrix using the received information; and generating a new codebook or recognizing a new preferred codeword of the receiver by rotating a reference codebook using the rotation matrix.

41. The method for claim 40, wherein:

the at least one candidate pre-stored in the memory is based on codewords of a DFT codebook; and the information comprises an index of the at least one candidate.

42. A method of a receiver, the method comprising:

estimating a channel between a transmitter and the receiver;

selecting, as a rotation matrix, at least one candidate pre-stored in a memory based on the estimated channel; and feeding back, to the transmitter, information associated with the selected at least one candidate, wherein a new preferred codeword corresponding to the channel is calculated based on a reference codebook and the rotation matrix.

* * * * *